US012588977B2

(12) United States Patent
Gagnon et al.

(10) Patent No.: US 12,588,977 B2
(45) Date of Patent: Mar. 31, 2026

(54) DENTAL ALIGNER

(71) Applicant: Bixby International Corporation, Newburyport, MA (US)

(72) Inventors: Marc Gagnon, Exeter, NH (US); Tim Glowik, Danvers, MA (US); Ethel Bermejo, Somerville, MA (US); Rick Bass, Fremont, NH (US)

(73) Assignee: BIXBY INTERNATIONAL CORPORATION, Newburyport, MA (US)

(*) Notice: Subject to any disclaimer, the term of this patent is extended or adjusted under 35 U.S.C. 154(b) by 0 days.

(21) Appl. No.: 17/761,147

(22) PCT Filed: Aug. 11, 2021

(86) PCT No.: PCT/US2021/045595
§ 371 (c)(1),
(2) Date: Mar. 16, 2022

(87) PCT Pub. No.: WO2022/035991
PCT Pub. Date: Feb. 17, 2022

(65) Prior Publication Data

US 2024/0050197 A1 Feb. 15, 2024

Related U.S. Application Data

(60) Provisional application No. 63/064,158, filed on Aug. 11, 2020.

(51) Int. Cl.
*A61C 7/08* (2006.01)

(52) U.S. Cl.
CPC .......... *A61C 7/08* (2013.01); *A61C 2201/007* (2013.01)

(58) Field of Classification Search
CPC .. A61C 7/08; A61C 2201/007; A61C 7/00–36
See application file for complete search history.

(56) References Cited

U.S. PATENT DOCUMENTS 4,410,595 A 10/1983 Matsumoto et al.
4,717,341 A 1/1988 Goldberg et al.
(Continued)

FOREIGN PATENT DOCUMENTS

CN 105431107 A 3/2016
CN 108495597 A 9/2018
(Continued)

OTHER PUBLICATIONS

The relationship between Shore hardness of elastomeric dental materials and Youngâs modulus, Iranthi M. Meththananda, Sandra Parker â, Mangala P. Patel, Michael Braden, Dental Materials 25 (2009) pp. 956-959 (Year: 2009).*
(Continued)

*Primary Examiner* — Thomas C Barrett
*Assistant Examiner* — Matthew P Saunders
(74) *Attorney, Agent, or Firm* — Adler Pollock & Sheehan P.C.

(57) ABSTRACT

The instant invention provides dental aligner(s) that can be better tuned to deliver a specific and more stable (lower creep) force on the teeth while also being softer and thinner. The instant dental aligners also provide the medical practitioner greater control to customize the treatment based on a patient's therapeutic stage, discreet requirements, and pain tolerance.

7 Claims, 15 Drawing Sheets

Cross-Section of Aligner on Tooth

(56) References Cited

U.S. PATENT DOCUMENTS

| | | | | |
|---|---|---|---|---|
| 6,386,864 | B1 | 5/2002 | Kuo | |
| 6,390,812 | B1* | 5/2002 | Chishti | A61C 7/08 433/24 |
| 6,454,565 | B2 | 9/2002 | Phan et al. | |
| 6,485,298 | B2 | 11/2002 | Chishti et al. | |
| 6,607,382 | B1 | 8/2003 | Kuo et al. | |
| 6,705,861 | B2 | 3/2004 | Chishti et al. | |
| 6,814,574 | B2 | 11/2004 | Abolfathi et al. | |
| 6,964,564 | B2 | 11/2005 | Phan et al. | |
| 6,976,627 | B1 | 12/2005 | Culp et al. | |
| 7,121,825 | B2 | 10/2006 | Chishti et al. | |
| 7,210,926 | B2 | 5/2007 | Tadros et al. | |
| 7,553,157 | B2 | 6/2009 | Abolfathi et al. | |
| 7,611,058 | B2 | 11/2009 | Culp et al. | |
| 7,641,828 | B2 | 1/2010 | Desimone et al. | |
| 7,854,609 | B2 | 12/2010 | Chen et al. | |
| 7,878,801 | B2 | 2/2011 | Abolfathi et al. | |
| 7,883,334 | B2 | 2/2011 | Li et al. | |
| 7,905,724 | B2 | 3/2011 | Kuo et al. | |
| 8,235,713 | B2 | 8/2012 | Phan et al. | |
| 8,316,859 | B2 | 11/2012 | Lesniak | |
| 8,496,474 | B2 | 7/2013 | Chishti et al. | |
| 8,504,193 | B2 | 8/2013 | Spiridonov et al. | |
| 8,758,009 | B2 | 6/2014 | Chen et al. | |
| 8,765,031 | B2 | 7/2014 | Li et al. | |
| 8,858,226 | B2 | 10/2014 | Phan et al. | |
| 9,161,824 | B2 | 10/2015 | Chishti et al. | |
| 9,345,562 | B2 | 5/2016 | Kopelman | |
| 9,351,809 | B2 | 5/2016 | Phan et al. | |
| 9,539,071 | B2 | 1/2017 | Taub et al. | |
| 9,597,165 | B2 | 3/2017 | Kopelman | |
| 9,610,141 | B2 | 4/2017 | Kopelman et al. | |
| 9,655,691 | B2 | 5/2017 | Li et al. | |
| 9,655,693 | B2 | 5/2017 | Li et al. | |
| 9,693,839 | B2 | 7/2017 | Atiya et al. | |
| 9,782,238 | B2 | 10/2017 | Kopelman | |
| 9,855,701 | B2 | 1/2018 | Phan et al. | |
| 9,956,058 | B2 | 5/2018 | Kopelman | |
| 10,004,578 | B1 | 6/2018 | Kaza et al. | |
| 10,052,176 | B2 | 8/2018 | Li et al. | |
| 10,058,404 | B2 | 8/2018 | Atiya et al. | |
| 10,154,889 | B2 | 12/2018 | Chen et al. | |
| 10,201,409 | B2 | 2/2019 | Mason et al. | |
| 10,495,973 | B2 | 12/2019 | Cole | |
| 10,555,792 | B2 | 2/2020 | Kopelman et al. | |
| 10,717,208 | B1 | 7/2020 | Raslambekov et al. | |
| 10,781,275 | B2 | 9/2020 | Liska et al. | |
| 10,973,613 | B2 | 4/2021 | Li et al. | |
| 11,813,136 | B2* | 11/2023 | Boronkay | A61C 7/146 |
| 2004/0086468 | A1 | 5/2004 | Prosise et al. | |
| 2004/0109783 | A1 | 6/2004 | Prasad et al. | |
| 2005/0100853 | A1* | 5/2005 | Tadros | A61C 19/063 433/6 |
| 2006/0078841 | A1 | 4/2006 | Desimone et al. | |
| 2006/0093982 | A1 | 5/2006 | Wen | |
| 2008/0248438 | A1 | 10/2008 | Desimone et al. | |
| 2008/0299507 | A1* | 12/2008 | Li | A61C 7/08 433/24 |
| 2010/0196837 | A1 | 8/2010 | Farrell | |
| 2012/0196243 | A1 | 8/2012 | Farrell | |
| 2013/0302742 | A1* | 11/2013 | Li | B32B 25/20 264/16 |
| 2015/0306283 | A1 | 10/2015 | Endo et al. | |
| 2017/0007368 | A1* | 1/2017 | Boronkay | A61C 7/146 |
| 2019/0053876 | A1 | 2/2019 | Sterental et al. | |
| 2019/0159870 | A1* | 5/2019 | Li | B32B 27/365 |
| 2019/0175303 | A1 | 6/2019 | Akopov et al. | |
| 2020/0093576 | A1 | 3/2020 | Cinader et al. | |
| 2020/0130333 | A1* | 4/2020 | Stewart | B32B 27/365 |
| 2021/0093420 | A1* | 4/2021 | Boronkay | A61C 7/36 |
| 2021/0177549 | A1 | 6/2021 | Connell et al. | |
| 2021/0178639 | A1 | 6/2021 | Lukacs et al. | |

FOREIGN PATENT DOCUMENTS

| | | | |
|---|---|---|---|
| CN | 110087578 | A | 8/2019 |
| CN | 110215300 | A | 9/2019 |
| CN | 110811875 | A | 2/2020 |
| CN | 111361249 | A | 7/2020 |
| EP | 0230394 | B1 | 1/1992 |
| WO | 2019239286 | A1 | 12/2019 |
| WO | 2020003169 | A1 | 1/2020 |
| WO | 2020058927 | A1 | 3/2020 |
| WO | 2020069446 | A1 | 4/2020 |
| WO | 2020079555 | A1 | 4/2020 |
| WO | 2020099973 | A1 | 5/2020 |
| WO | 2020104926 | A1 | 5/2020 |
| WO | 2020120775 | A2 | 6/2020 |
| WO | 2020141444 | A1 | 7/2020 |
| WO | 2020190698 | A1 | 9/2020 |
| WO | 2021033151 | A1 | 2/2021 |
| WO | 2021105878 | A1 | 6/2021 |

OTHER PUBLICATIONS

International Search Report and Written Opinion received in International Application No. PCT/US2021/045595 mailed on Nov. 29, 2021,13 pages.

"Extended European Search Report received for EP Patent Application No. 21856659.4, mailed on Oct. 2, 2023", 8 pages.

"Partial Supplementary European Search Report received for EP Patent Application No. 21856659.4, mailed on Jul. 24, 2023", 12 pages.

Ahn, et al., "A New Type of Clear Orthodontic Retainer Incorporating Multi-layer Hybrid Materials", The Korean Journal of Orthodontics, vol. 45, Issue 5, Sep. 2015, pp. 268-272.

Hurteau, et al., "The Polymer's Path to a Straighter Smile", Bixby International, May 6, 2021, 6 pages.

Lombardoa, et al., "Stress Relaxation Properties of Four Orthodontic Aligner Materials: A 24-hour in vitro study", Angle Orthodontist, vol. 87, No. 1, 2017, pp. 11-18.

Oréfice, et al., "Processing, Properties, and in Vitro Bioactivity of Polysulfone-Bioactive Glass Composites", Journal of Biomedical Materials Research Part A, vol. 80, Issue 3, Jan. 18, 2007, pp. 565-580.

"Extended European Search Report received for European Patent Application No. 25190757.2, mailed on Sep. 15, 2025", 8 pages.

Sensient Cosmetic Technologies, "Cosmetic Pigments", 2015, 9 pages.

* cited by examiner

Aligner (cross-section detail)

Cross-Section of Aligner on Tooth

<u>Thickness</u>

<<< 5 - 25 mils

<<< 5 - 25 mils

Two Layer Hybrid Dental Aligner Construction

<u>Thickness</u>

<<< 1 - 4 mils

<<< 15 - 25 mils

Two Layer High Temperature

| Structural Formula | Trade Name | Systematic Name |
|---|---|---|
| | | |
| 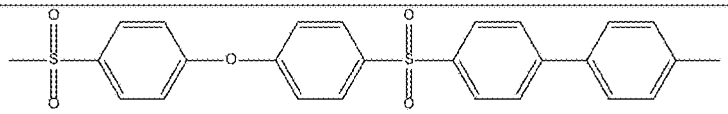 | Poly (arylene sulfone) PAS | |
| 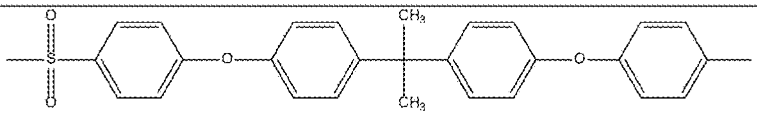 | Poly(bisphenol-A-Sulfone) (PSF) | Poly[oxy-1,4-phenylensolfonyl-1,4-phenyleneoxy-1,4-phenylen(1-methylethyliden)-1,4-phenylen] |
| 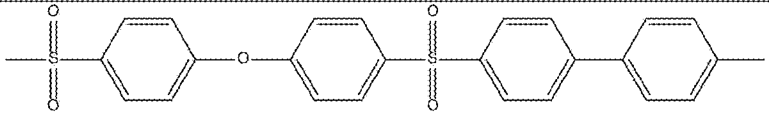 | Polyether Sulfone (PES) | Poly(oxy-1,4-phenylsulfonyl-1,4pphenyl) |
| 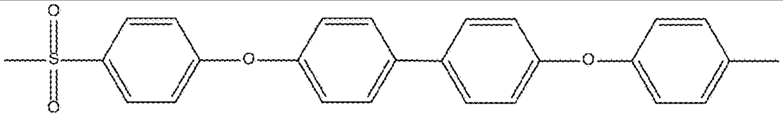 | Polyphenylenesulfone (PPSU) | |
| 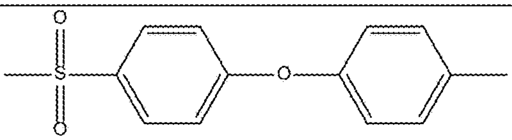 | Polysulfone (PSU) | Poly(oxy-1,4-phenylensolfonyl-1,4-phenylene) |
| 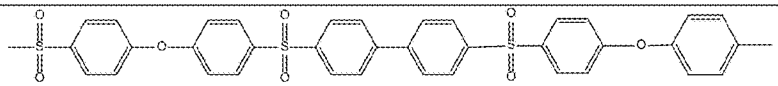 | Victrex HTA | |
Figure 12

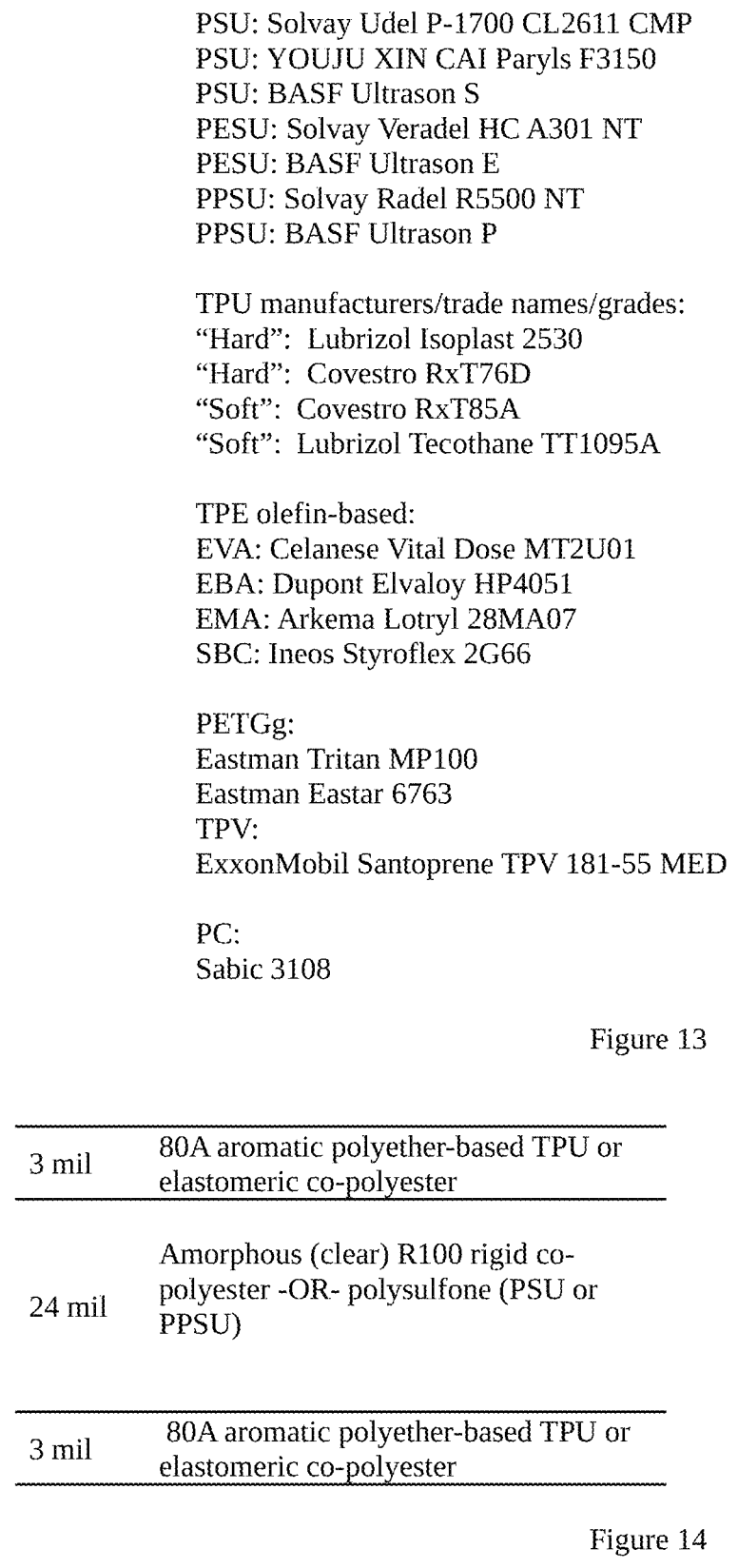

PSU: Solvay Udel P-1700 CL2611 CMP
PSU: YOUJU XIN CAI Paryls F3150
PSU: BASF Ultrason S
PESU: Solvay Veradel HC A301 NT
PESU: BASF Ultrason E
PPSU: Solvay Radel R5500 NT
PPSU: BASF Ultrason P TPU manufacturers/trade names/grades:
"Hard": Lubrizol Isoplast 2530
"Hard": Covestro RxT76D
"Soft": Covestro RxT85A
"Soft": Lubrizol Tecothane TT1095A TPE olefin-based:
EVA: Celanese Vital Dose MT2U01
EBA: Dupont Elvaloy HP4051
EMA: Arkema Lotryl 28MA07
SBC: Ineos Styroflex 2G66

PETGg:
Eastman Tritan MP100
Eastman Eastar 6763
TPV:
ExxonMobil Santoprene TPV 181-55 MED PC:
Sabic 3108

Figure 13

| | |
|---|---|
| 3 mil | 80A aromatic polyether-based TPU or elastomeric co-polyester |
| 24 mil | Amorphous (clear) R100 rigid co-polyester -OR- polysulfone (PSU or PPSU) |
| 3 mil | 80A aromatic polyether-based TPU or elastomeric co-polyester |

Figure 14

| | |
|---|---|
| 10 mil | Amorphous (clear) R100 rigid co-polyester -OR- polysulfone (PSU or PPSU) |
| 10 mil | 80A aromatic polyether-based TPU or elastomeric co-polyester |
| 10 mil | Amorphous (clear) R100 rigid co-polyester -OR- polysulfone (PSU or PPSU) |

Figure 15

| | |
|---|---|
| 4 mil | 80A aromatic polyether-based TPU or elastomeric co-polyester |
| 26 mil | Amorphous (clear) R100 rigid co-polyester -OR- polysulfone (PSU or PPSU) |

Figure 16

| | |
|---|---|
| 15-30 mils | Amorphous (clear) R100 rigid co-polyester / block co-polymer elastomer Blend or 100% Polysulfone |

Figure 17

| | |
|---|---|
| 8 mil | Amorphous (clear) R100 rigid co-polyester |
| 3 mil | 80A aromatic polyether-based TPU or elastomeric co-polyester |
| 15 mil | polysulfone (PSU or PPSU) |

Figure 18

| | |
|---|---|
| 3 mil | 80A aromatic polyether-based TPU or elastomeric co-polyester |
| 24 mil | polysulfone (PSU or PPSU) w/ bluing agent |
| 3 mil | 80A aromatic polyether-based TPU or elastomeric co-polyester |

Figure 19

| | |
|---|---|
| 4 mil | 80A aromatic polyether-based TPU or elastomeric co-polyester |
| 19 mil | polysulfone (PSU or PPSU) |

Figure 20

| | |
|---|---|
| 10 mil | Amorphous (clear) R100 rigid co-polyester -OR- polysulfone (PSU or PPSU) + 0.5% - 15% naproxen (this layer is on the cheek side) |
| 10 mil | 80A aromatic polyether-based TPU or elastomeric co-polyester |
| 10 mil | Amorphous (clear) R100 rigid co-polyester -OR- polysulfone (PSU or PPSU) |

Figure 21

| | |
|---|---|
| 4 mil | 80A aromatic polyether-based TPU or elastomeric co-polyester + 0.5% - 10% naproxen (this layer is on the cheek side) |
| 26 mil | Amorphous (clear) R100 rigid co-polyester -OR- polysulfone (PSU or PPSU) |

Figure 22

| | |
|---|---|
| 30 mil | Amorphous (clear) R100 rigid co-polyester -OR- polysulfone (PSU or PPSU) + 5% - 25% naproxen |

Figure 23

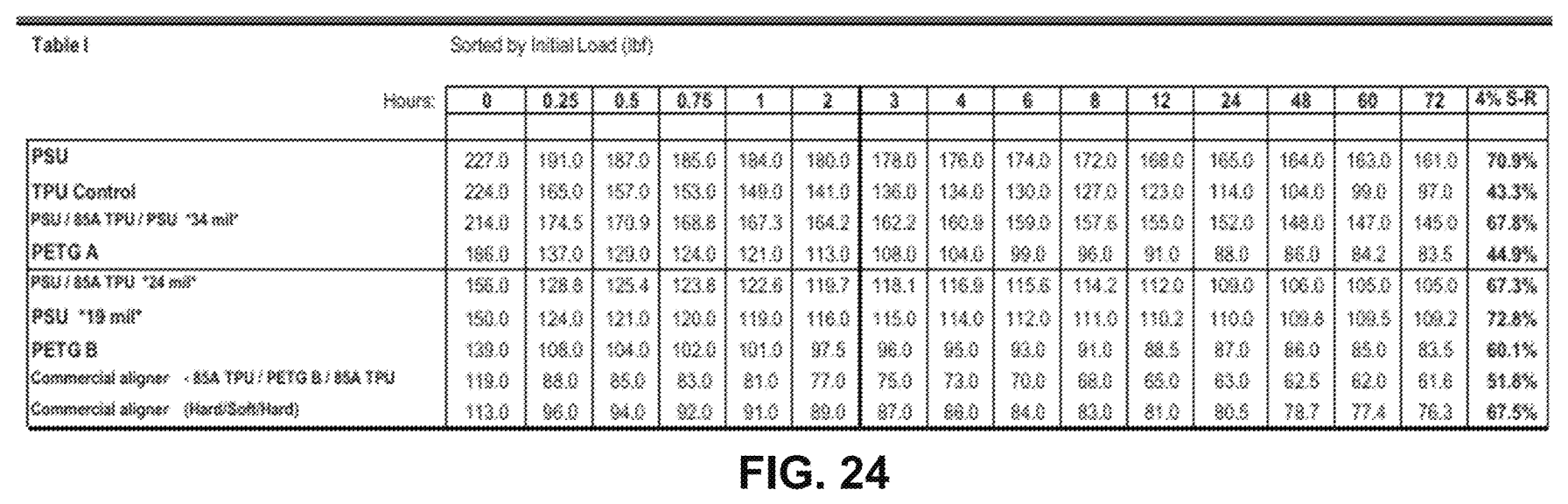

Table I

Sorted by Initial Load (lbf)

| Hours: | 0 | 0.25 | 0.5 | 0.75 | 1 | 2 | 3 | 4 | 6 | 8 | 12 | 24 | 48 | 60 | 72 | 4% S-R |
|---|---|---|---|---|---|---|---|---|---|---|---|---|---|---|---|---|
| PSU | 227.0 | 191.0 | 187.0 | 185.0 | 184.0 | 180.0 | 178.0 | 176.0 | 174.0 | 172.0 | 169.0 | 165.0 | 164.0 | 163.0 | 161.0 | 70.9% |
| TPU Control | 224.0 | 165.0 | 157.0 | 153.0 | 149.0 | 141.0 | 136.0 | 134.0 | 130.0 | 127.0 | 123.0 | 114.0 | 104.0 | 99.0 | 97.0 | 43.3% |
| PSU / 85A TPU / PSU "34 mil" | 214.0 | 174.5 | 170.9 | 168.8 | 167.3 | 164.2 | 162.2 | 160.9 | 159.0 | 157.6 | 155.0 | 152.0 | 148.0 | 147.0 | 145.0 | 67.8% |
| PETG A | 186.0 | 137.0 | 129.0 | 124.0 | 121.0 | 113.0 | 108.0 | 104.0 | 99.0 | 96.0 | 91.0 | 88.0 | 86.0 | 84.2 | 83.5 | 44.9% |
| PSU / 85A TPU "24 mil" | 156.0 | 128.8 | 125.4 | 123.8 | 122.6 | 119.7 | 118.1 | 116.9 | 115.6 | 114.2 | 112.0 | 109.0 | 106.0 | 105.0 | 105.0 | 67.3% |
| PSU "19 mil" | 150.0 | 124.0 | 121.0 | 120.0 | 119.0 | 116.0 | 115.0 | 114.0 | 112.0 | 111.0 | 110.2 | 110.0 | 109.8 | 109.5 | 109.2 | 72.8% |
| PETG B | 139.0 | 106.0 | 104.0 | 102.0 | 101.0 | 97.5 | 96.0 | 95.0 | 93.0 | 91.0 | 88.5 | 87.0 | 86.0 | 85.0 | 83.5 | 60.1% |
| Commercial aligner - 85A TPU / PETG B / 85A TPU | 119.0 | 88.0 | 85.0 | 83.0 | 81.0 | 77.0 | 75.0 | 73.0 | 70.0 | 68.0 | 66.0 | 63.0 | 62.5 | 62.0 | 61.6 | 51.8% |
| Commercial aligner (Hard/Soft/Hard) | 113.0 | 96.0 | 94.0 | 92.0 | 91.0 | 89.0 | 87.0 | 86.0 | 84.0 | 83.0 | 81.0 | 80.5 | 78.7 | 77.4 | 76.3 | 67.5% |

FIG. 24

Table II : Sorted by least percentage stress loss

| Hours: | 0 | 0.25 | 0.5 | 0.75 | 1 | 2 | 3 | 4 | 6 | 8 | 12 | 24 | 48 | 60 | 72 | 4% S-R |
|---|---|---|---|---|---|---|---|---|---|---|---|---|---|---|---|---|
| | | | | | | | | | | | | | | | | |
| PSU "19 mil" | 150.0 | 124.0 | 121.0 | 120.0 | 119.0 | 116.0 | 115.0 | 114.0 | 112.0 | 111.0 | 110.2 | 110.0 | 109.8 | 109.5 | 109.2 | 72.8% |
| PSU | 227.0 | 191.0 | 187.0 | 185.0 | 184.0 | 180.0 | 178.0 | 176.0 | 174.0 | 172.0 | 168.0 | 165.0 | 164.0 | 163.0 | 161.0 | 70.9% |
| PSU / 85A TPU / PSU "34 mil" | 214.0 | 174.5 | 170.9 | 168.8 | 167.3 | 164.2 | 162.2 | 160.9 | 159.0 | 157.6 | 156.0 | 152.0 | 148.0 | 147.0 | 145.0 | 67.8% |
| Commercial aligner (Hard/Soft/Hard) | 113.0 | 96.0 | 94.0 | 92.0 | 91.0 | 89.0 | 87.0 | 86.0 | 84.0 | 83.0 | 81.0 | 80.5 | 78.7 | 77.4 | 76.3 | 67.5% |
| PSU / 85A TPU "24 mil" | 196.0 | 128.9 | 125.4 | 123.8 | 122.6 | 119.7 | 118.1 | 116.9 | 115.6 | 114.2 | 112.0 | 109.0 | 106.0 | 105.0 | 105.0 | 67.3% |
| PETG B | 139.0 | 108.0 | 104.0 | 102.0 | 101.0 | 97.5 | 96.0 | 95.0 | 93.0 | 91.0 | 88.5 | 87.0 | 86.0 | 85.0 | 83.5 | 60.1% |
| Commercial aligner - 85A TPU / PETG B / 85A TPU | 119.0 | 88.0 | 85.0 | 83.0 | 81.0 | 77.0 | 75.0 | 73.0 | 70.0 | 68.0 | 65.0 | 63.0 | 62.5 | 62.0 | 61.6 | 51.8% |
| PETG A | 186.0 | 137.0 | 129.0 | 124.0 | 121.0 | 113.0 | 108.0 | 104.0 | 99.0 | 96.0 | 91.0 | 88.0 | 86.0 | 84.2 | 83.5 | 44.9% |
| TPU Control | 224.0 | 165.0 | 157.0 | 153.0 | 149.0 | 141.0 | 136.0 | 134.0 | 130.0 | 127.0 | 123.0 | 114.0 | 104.0 | 99.0 | 97.0 | 43.3% |

FIG. 26

| | Area under the Curve (72 hours) |
|---|---|
| PSU | 193,178,768 |
| PSU / 85A TPU / PSU *34 mil* | 174,463,543 |
| PSU *19 mil* | 127,505,576 |
| PSU / 85A TPU *24 mil* | 124,826,040 |
| TPU Control | 114,472,046 |
| PETG B | 102,974,538 |
| Commercial aligner (Hard/Soft/Hard) | 93,492,100 |
| PETG A | 82,970,363 |
| Commercial aligner - 85A TPU / PETG B / 85A TPU | 70,208,400 |

DENTAL ALIGNER

REFERENCE TO RELATED APPLICATIONS

This application claims priority from U.S. Provisional Patent Application No. 63/064,158 filed on Aug. 11, 2020, the contents of which are incorporated herein in their entirety.

FIELD OF THE INVENTION

The instant invention relates to dental aligner(s) that can be tuned to deliver a specific and more stable (lower creep) force on the teeth while also being softer and thinner. The instant dental aligners also provide the medical practitioner greater control to customize the treatment based on a patient's therapeutic stage, discreet requirements, and pain tolerance.

BACKGROUND OF THE INVENTION

Many individuals have teeth that need to be straightened. Braces have been used to align or move the teeth. Brackets are connected by wires. Aligners on the other hand are a series of tight-fitting custom-made mouthpieces that slip over the teeth. Invisalign is the largest producer of clear aligners, but it's not the only brand. Others include Clear Correct, Inman Aligner, and Smart Moves.

The initial hours or days of wearing currently available plastic dental aligners (e.g. like Invisalign™) can be painful and uncomfortable for the patient. These aligners are purposely designed to exert relatively high levels of force on the teeth—so the aligners are often stiff and thick which also makes them difficult and painful to insert on the teeth. Patients go through this initial pain and discomfort many times during the teeth-straightening process because these processes involve the sequential use of several aligners—for example, 20 aligners over 6 months. Furthermore, discomfort and pain prompt many patients to remove the aligner more frequently, thus adding weeks or months to the treatment time. If one aligner step does not bring the patient fully to the next step in their sequence, a costly intervention called a "mid-course correction" is required to continue the prescribed alignment therapy.

The discomfort, pain and inefficiency come as a result of the plastic constructions currently used in the aligners. These have traditionally relied on hard, stiff plastics to provide the physical properties (primarily force) required for effective alignment. Traditional plastic constructions also exhibit sub-optimal force creep—i.e., the force exerted by the aligner declines very rapidly as the polymer creeps early after insertion, particularly over the initial 24 hours. This creep reduces the effective force available to move the teeth through the remainder of that retainer sequence. Therefore, each retainer must be more aggressively designed to compensate for loss of force due to creep yet still remain effective in moving teeth. The materials used in these aligners offer limited force and creep design control. For the patient, this translates into higher pain and discomfort (particularly during the first hour or so of use), and it often results in the need for several visits to the dentist.

Given the foregoing limitations there is an unmet need for dental aligners which address the shortcomings of the existing dental aligners. Keeping the foregoing need in mind, the instant invention provides a dental aligner that can be better tuned to deliver a specific and more stable (lower creep) force on the teeth while also being softer and thinner. Such an aligner would create a better experience for patients and give the medical practitioner greater control to customize the treatment based on a patient's therapeutic stage, discreet requirements, and pain tolerance. Using a retainer construction with a tunable force and creep profile can create a treatment process that likely results in better compliance, fewer mid-course corrections, less pain, and ultimately better treatment outcomes.

SUMMARY OF THE INVENTION

The instant invention in one embodiment provides a dental aligner comprising a component consisting of a plastic material having a Rockwell R hardness of greater than about 50 and less than about 130, and wherein the component is selected from polyethylene terephthalate glycol (PETG), rigid thermoplastic polyurethane (r-TPU), polysulfone, and combinations thereof.

Provided in another embodiment is a dental aligner comprising an outer layer and an inner component, wherein the outer layer is soft and comprises a polymer having a Shore hardness from about 50 A to about 60 D, and is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof; and the inner component is harder than the outer layer and consists of a plastic material having a Rockwell R hardness greater than about 60 and less than about 115, and wherein the plastic material is selected from polyethylene terephthalate glycol (PETG), rigid thermoplastic polyurethane (r-TPU), polysulfone, and combinations thereof.

Another aspect of the instant invention provides a dental aligner comprising multiple layers of material, selected from a core or inner layer, and skin or outer layers wherein, the core layer has a hard/strong component made using a plastic material having a Rockwell R hardness greater than about 60 and less than about 115, and is selected from polyethylene terephthalate glycol (PETG), rigid thermoplastic polyurethane (r-TPU), polysulfone, and combinations thereof; and the skin layers comprise a soft polymer having a Shore hardness from about 50 A to about 60 D, and is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

Yet another aspect of the instant invention provides a dental aligner comprising an outer layer and an inner layer, wherein the outer layer is hard and comprises a thermoplastic material having a Rockwell R hardness of greater than about 60 and less than about 110, and wherein the thermoplastic material is selected from a family of homo and co-polymers of polysulfone and blends thereof; and the inner layer against the tooth is softer than the outer layer and consists of a thermoplastic material having a Shore hardness from about 50 A to about 60 D, and a thermoplastic material is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

Another aspect of the instant invention provides a dental aligner comprising multiple layers of materials, selected from a core or inner layer, and skin or outer layers wherein the core layer has a rigid thermoplastic material having a Rockwell R hardness of greater than about 60 and less than about 110, and wherein the thermoplastic material is selected from a family of homo and co-polymers of polysulfone and blends thereof; and the skin layers comprise a soft thermoplastic polymer having a Shore hardness from about 50 A to about 60 D, and a thermoplastic material is selected from is thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

The instant invention in one embodiment provides a dental aligner comprising a component consisting of a plastic material having a shore hardness of greater than about 55 D and less than about R100, and wherein the component is selected from polyethylene terephthalate glycol (PETG), rigid thermoplastic polyurethane (r-TPU), polysulfone, and combinations thereof. A preferred embodiment provides a dental aligner having a total thickness of from about mils to about 20 mils.

Another preferred embodiment provides a dental aligner wherein the dental aligner has a modulus ranging from about 200,000 psi but less than about 500,000 psi and applies an initial force ranging from about 120 lbs to about 300 lbs.

Another embodiment of this aspect of the invention provides a dental aligner wherein incorporated within the plastic material are active ingredients and/or therapeutic compositions selected from pain relief medicines, anti-bacterial agents, teeth whitening agents, and agents that enhance dental treatment(s). A preferred embodiment of this aspect provides a dental aligner wherein the plastic materials, over a period of time, release active ingredients and/or therapeutic compositions such as pain relief medicines, anti-bacterial agents, teeth whitening agents, or other agents that enhance dental treatment(s).

Another aspect of the present invention provides a dental aligner comprising an outer layer and an inner component, wherein the outer layer is soft and comprises a polymer having a shore hardness component from about 50 A to about 50 D, and is selected from TPU, TPE, elastomeric co-polyester, TPV, EMA, EBA, and combinations thereof; and the inner component is harder than the outer layer and consists of a plastic material having a shore hardness component greater than about 50 D and less than about R100, and wherein the plastic material is selected from polyethylene terephthalate glycol (PETG), polysulfone, and thermoplastic polyurethane (TPU), and combinations thereof.

A preferred embodiment of this aspect of the invention provides a dental aligner of claim 4 wherein, the outer soft layer makes up from about 10% to about 20% of the total thickness of the dental aligner. Provides in a further preferred embodiment is a dental aligner of claim 5 wherein the outer soft layer makes up from about 5% to about 15% of the total thickness of the dental aligner.

Another preferred embodiment provides a dental aligner wherein the dental aligner has a modulus of about 200,000 psi and less than about 500,000 psi and applies an initial force of about 120 lbs but less than about 300 lbs.

Another embodiment of this aspect of the invention provides a dental aligner wherein incorporated within the outer soft layer are active ingredients and/or therapeutic compositions selected from pain relief medicines, anti-bacterial agents, teeth whitening agents, and agents that enhance dental treatment(s). A preferred embodiment of this aspect provides a dental aligner wherein the outer soft layer, over a period of time, releases active ingredients and/or therapeutic compositions such as pain relief medicines, anti-bacterial agents, teeth whitening agents, or other agents that enhance dental treatment(s).

Another aspect of the present invention provides a dental aligner comprising multiple layers of material, selected from a core or inner layer, and skin or outer layer(s) wherein the core layer comprises a hard/strong component made using a plastic material having a shore hardness component greater than about 50 D and less than about R100, and is selected from polyethylene terephthalate glycol (PETG), polysulfone, thermoplastic polyurethane (TPU), and combinations thereof; and the skin layer(s) comprise a soft polymer having a shore hardness component from about 50 A to about 50 D, and is selected from TPU, TPE, elastomeric co-polyester, TPV, EMA, EBA, and combinations thereof.

An embodiment of this aspect of the invention provides a dental aligner wherein incorporated within the outer soft layer are active ingredients and/or therapeutic compositions selected from pain relief medicines, anti-bacterial agents, teeth whitening agents, and agents that enhance dental treatment(s). A preferred embodiment of this aspect provides a dental aligner wherein the outer soft layer, over a period of time, releases active ingredients and/or therapeutic compositions such as pain relief medicines, anti-bacterial agents, teeth whitening agents, or other agents that enhance dental treatment(s).

A preferred embodiment of this aspect of the invention provides a dental aligner wherein, the soft/skin layer(s) makes up from about 10% to about 30% of the total thickness of the dental aligner. A further preferred embodiment provides a dental aligner wherein the soft/skin layer(s) makes up from about 5% to about 25% of the total thickness of the dental aligner.

Provided in yet another preferred embodiment is a dental aligner wherein, the soft/skin layer(s) has/have a shore hardness component greater than about 50 A and less than about 80 A.

Yet another preferred embodiment provides a dental aligner wherein, the dental aligner has a modulus of about 200,000 psi but less than about 500,000 psi, and applies an initial force of about 120 lbs but less than about 300 psi.

Provided in yet another aspect of the present invention is a dental aligner of wherein, the soft/skin layer has a hard/core layer sandwiched between two soft plastic layers, wherein the thickness of the hard/core layer is about 24 mil and the thickness of each of the soft/skin layers is about 3 mils.

Yet another aspect of the present invention provides a dental aligner wherein the outer soft layer comprises active ingredients and/or therapeutic compositions selected from pain relief medicines, anti-bacterial agents, teeth whitening agents, and agents that enhance dental treatment(s). A preferred embodiment of this aspect provides a dental aligner wherein the outer soft layer over a period of time releases active ingredients and/or therapeutic compositions such as pain relief medicines, anti-bacterial agents, teeth whitening agents, or other agents that enhance dental treatment(s).

BRIEF DESCRIPTION OF THE DRAWINGS

FIG. 3 depicts a monolayer dental aligner construction with a thickness of about 15-30 mils. This uses a clear-high temperature polymer and polymer blends thereof, in particular polysulfone (PSU for polysulfone, PES for polyether sulfone, and PPSU polyphenylene sulfone along with about 0.05% to about 2% by weight of bluing dye agents. The blue pigments are selected from a family of ultramarine chemical moieties such as Ultramarine is a complex sodium silicate containing sulfur and aluminum with the chemical formula $Na_7A_{16}Si_6O_{24}S_3$. The intense and unique blue color is caused by the unpaired electron in the sulfur radical anions S3−. It is chemically stable under normal conditions and is also resistant to high temperatures as outlined in https://colourlex.com/project/ultramarine-natural/. This construction adds improved structural application of force for tooth movement and reduction of creep/stress relaxation.

First Layer: This layer is in contact with the tooth and comprises about Shore 80 A Elastomer-aromatic polyether based TPU; COPE; SBC, olefin functional elastomer. This layer is from about 1 mil to 5 mils thick and is made using a cast or coex extrusion (for multi-layer core for bonding) or full-coat roll coating. This layer provides grip traction to teeth and assist in teeth movement.

Second Layer: This layer is the middle layer and comprises amorphous (clear) rigid co-polyester & blends thereof+0.05%-2% by wt. bluing dye agents. This layer is from about 3 mils to about 20 mils thick and is made using a cast tandem extrusion process with surface treating—corona, plasma, flame, and/or priming. It provides an improved low-cost structural application of force for tooth/teeth movement, improved creep reduction, as well as enhanced forming and bonding characteristics in the laminate.

Third Layer: This layer is the outside and in contact with the cheek and tongue and comprises clear high-temperature polymers and blends thereof—polysulfone (PSU, PES, PPSU)+0.05%-2% by weight of bluing dye agents. This layer is from about 3 mils to about 20 mils thick and is made using a cast tandem extrusion process with surface treating—corona, plasma, flame, and/or priming. It provides improved low creep application of higher force to teeth.

Figure 5:
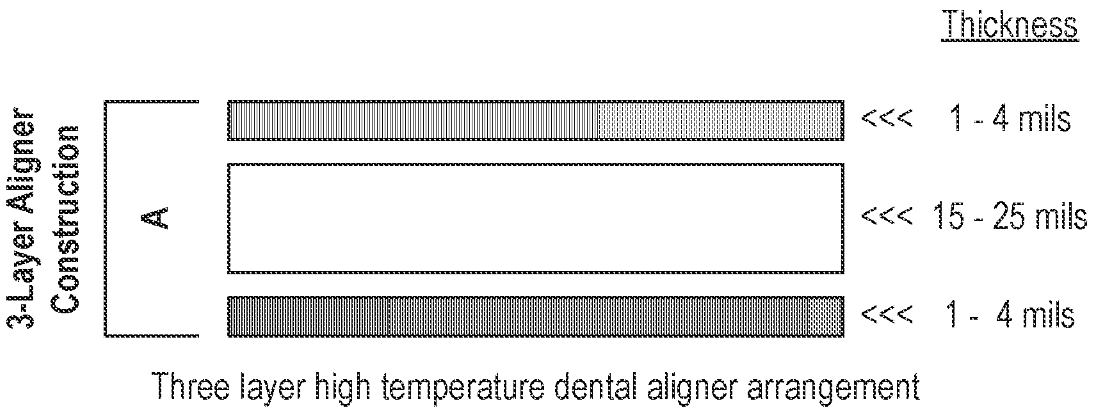

FIG. 5: This figure depicts a three layer high temperature dental aligner.

First Layer: This layer is in contact with the tooth and comprises about Shore 80 A Elastomer—aromatic polyether based TPU; COPE; SBC, olefin functional elastomer. This layer is from about 1 mil to about 4 mils thick and is made using a tandem extrusion or full coat roll-coating process. This layer provides grip traction to teeth and assists in teeth movement.

Second Layer: This layer is the middle layer and comprises clear high-temperature polymers and blends thereof—polysulfone (PSU, PES, PPSU)+0.05%-2% by weight of bluing dye agents. This layer is from about 15 mils to about 25 mils thick and is made using a cast tandem extrusion process with surface treating—corona, plasma, flame, and/or priming. This layer provides improved structural application of force for tooth/teeth movement and reduction of creep/stress relaxation.

Third Layer: This layer is in contact with the cheek/tongue and comprises about Shore 80 A Elastomer—aromatic polyether based TPU; COPE; SBC, olefin functional elastomer. This layer is from about 1 mil to about 4 mils thick and is made using a tandem extrusion or full coat roll-coating process. This layer provides comfort while in contact with the cheek and tongue.

Figure 6:
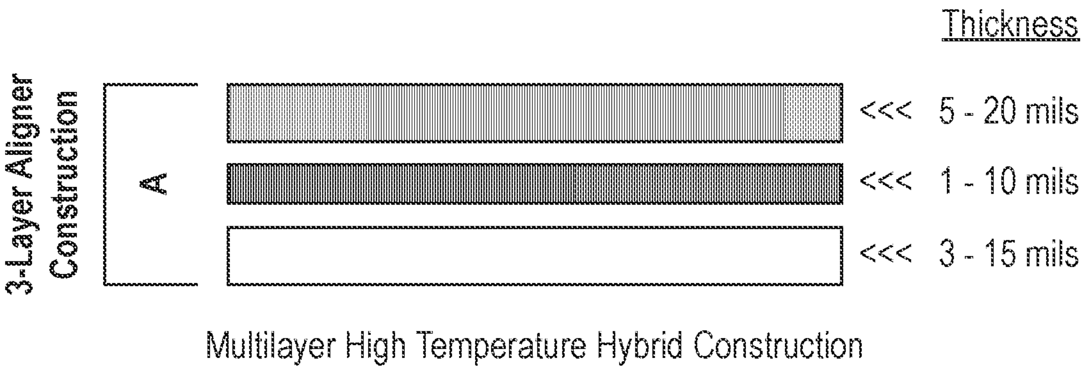

FIG. 6: This figure depicts a multilayer high temperature hybrid dental aligner.

First Layer: This layer is in contact with the teeth and comprises amorphous (clear) rigid co-polyester & blends thereof+0.05%-2% by wt. bluing dye agents. This layer is from about 3 mils to about 20 mils thick and is made using a cast tandem extrusion process with surface treating—corona, plasma, flame, and/or priming. It provides an improved low-cost structural application of force for tooth/teeth movement, and improved creep reduction, as well as enhanced forming and bonding characteristics in the laminate.

Second Layer: This layer is the middle layer and comprises about Shore 80 A Elastomer—aromatic polyether based TPU; COPE; SBC, olefin functional elastomer. This layer is from about 1 mil to about 10 mils thick and is made using cast and coex extrusion (for multi-layer core bond). This layer helps bond layers and comfortably transmits forces/strains from the outer skin rigid layers to the tooth/teeth.

Thirds Layer: This layer is in contact with the cheek and tongue and comprises clear high-temperature polymers and blends thereof—polysulfone (PSU, PES, PPSU)+ 0.05%-2% by weight of bluing dye agents. This layer is from about 3 mils to about 15 mils thick and is made using a cast tandem extrusion process with surface treating—corona, plasma, flame, and/or priming. This layer provides structural application of force for tooth/ teeth movement and reduction of creep/stress relaxation.

Figure 7:
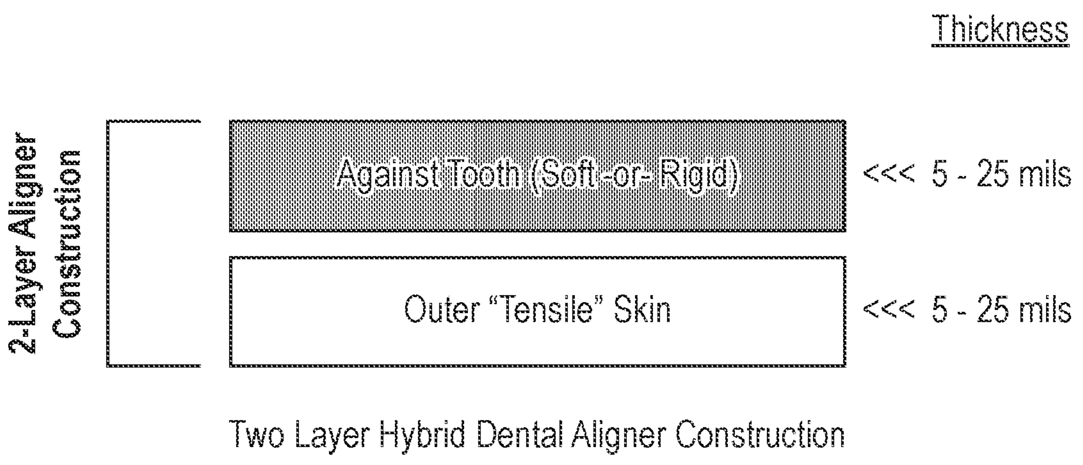

FIG. 7: This figure depicts a two-layer hybrid dental aligner. Each layer is from about 5 mils to about 25 mils thick.

First Layer: This layer is against the tooth and comprises amorphous (clear) rigid co-polyester & blends thereof+ 0.05%-2% by wt. bluing dye agents. This layer is made using a cast tandem extrusion process with surface treating—corona, plasma, flame, and/or priming. It provides an improved low-cost structural application of force for tooth/teeth movement, and improved creep reduction, as well as enhanced forming and bonding characteristics in the laminate.

Second Layer: This layer is in contact with the cheek/ tongue and comprises clear high-temperature polymers and blends thereof—polysulfone (PSU, PES, PPSU)+ 0.05%-2% by weight of bluing dye agents. This layer is made using a cast tandem extrusion process with surface treating—corona, plasma, flame, and/or priming. This layer provides improved structural application of force for tooth/teeth movement and greater reduction of creep/stress relaxation.

Figure 8:
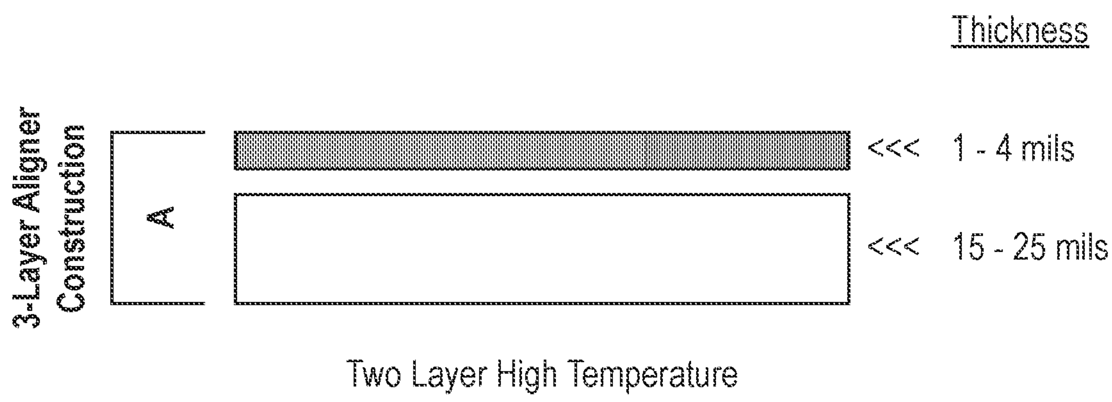

FIG. 8: This figure depicts a two layer high temperature aligner configuration.

First Layer: This layer is the inner layer in contact with the teeth and comprises about Shore 80 A Elastomer—aromatic polyether based TPU; COPE, or olefin functional elastomer. This layer is from about 1 mil to about 4 mils thick and is made using the tandem extrusion or full coat roll-coating process. This layer provides grip traction to teeth to assist movement and comfort of force application.

Second Layer: This layer is in contact with the cheek/ tongue and comprises clear high-temperature polymers and blends thereof—polysulfone (PSU, PES, PPSU)+ 0.05%-2% by weight of bluing dye agents. This layer is from about 15 mils to about 25 mils thick and is made using a cast tandem extrusion process with surface treating—corona, plasma, flame, and/or priming. This layer provides improved structural application of force for tooth/teeth movement and greater reduction of creep/stress relaxation.

Figure 9:
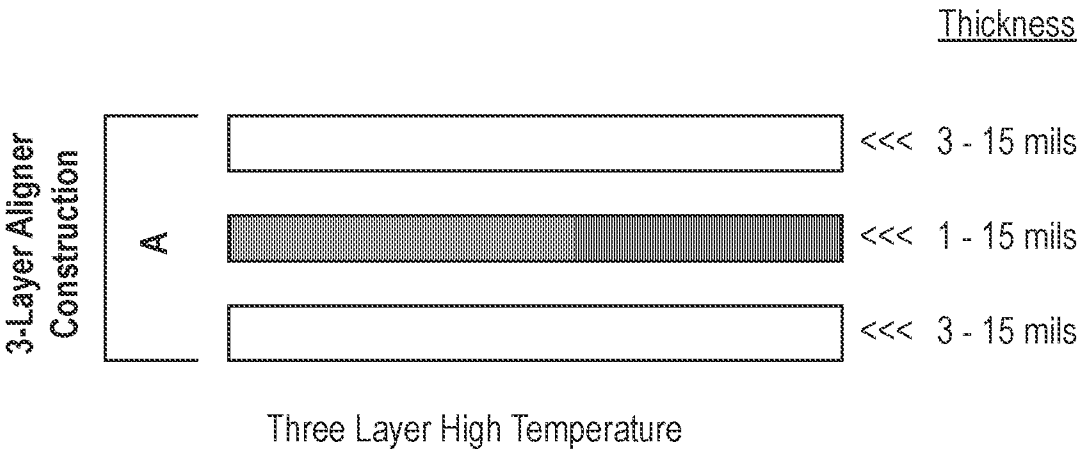

FIG. 9: This figure depicts a three layer high temperature aligner configuration.

First Layer: This layer is in contact with the cheek/tongue and comprises clear high-temperature polymers and blends thereof—polysulfone (PSU, PES, PPSU)+ 0.05%-2% by weight of bluing dye agents. This layer is from about 3 mils to about 15 mils thick and is made using a cast tandem extrusion process with surface treating—corona, plasma, flame, and/or priming. It provides an improved structural application of force for tooth/teeth movement and greater reduction of creep/ stress relaxation.

Second Layer: This layer is the middle layer and comprises about Shore 80 A Elastomer—aromatic polyether based TPU; COPE; SBC, olefin functional elastomer. This layer is from about 1 mil to about 15 mils thick and is made using cast and coex extrusion (for multi-layer soft core bond). This layer helps in bonding layers and comfortably transmitting forces/ strains from the outer rigid skin layers to the tooth/teeth thereby minimizing creep.

Third Layer: This layer is in contact with the tooth/teeth and comprises clear high-temperature polymers and blends thereof—polysulfone (PSU, PES, PPSU)+ 0.05%-2% by weight of bluing dye agents. This layer is from about 3 mils to about 15 mils thick and is made using a cast tandem extrusion process with surface treating—corona, plasma, flame, and/or priming. It provides an improved structural application of force for tooth/teeth movement and greater reduction of creep/ stress relaxation.

Figure 10:
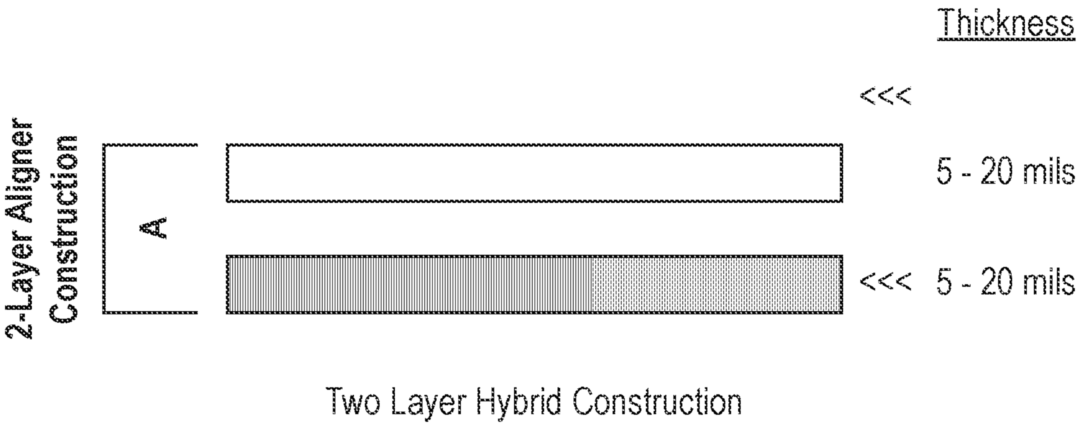

FIG. 10: This figure depicts a dental aligner with a two-layer hybrid construction. Each layer is between about 5 mils and 20 mils thick.

First Layer: This layer is in contact with the cheek/tongue and comprises clear high-temperature polymers and blends thereof—polysulfone (PSU, PES, PPSU) plus 0.05%-2% by weight of bluing dye agents. This layer is made using a cast tandem extrusion process with surface. It provides an improved structural application of force for tooth/teeth movement and greater reduction of creep/stress relaxation.

Second Layer: This layer is in contact with the tooth/teeth and comprises amorphous (clear) yet rigid co-polyester and blends thereof plus 0.05%-2% by weight of bluing dye agents. This layer is made using cast extrusion and surface treating (corona, plasma, flame, and/or priming). It provides high clarity, lower cost alternative. It also facilitates a structural application of force and low creep option for tooth/teeth movement.

Figure 11:
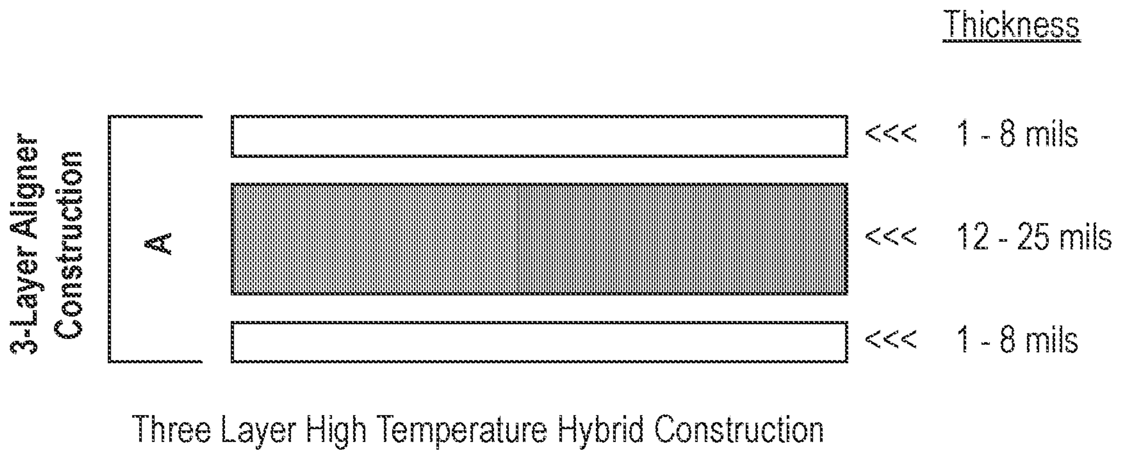

FIG. 11: This figure depicts a three layer high temperature hybrid construction dental aligner.

First Layer: This layer is from about 1 mil to 8 mils thick, and is in contact with the cheek/tongue and comprises clear high-temperature polymers and blends thereof—polysulfone (PSU, PES, PPSU) plus 0.05%-2% by weight of bluing dye agents. This layer is made using a cast extrusion and surface treating process (corona, plasma, flame, and/or priming). It provides an improved low creep application with a higher force for tooth/teeth movement.

Second Layer: This layer is from about 12 mils to about 25 mils thick, and is the middle layer and comprises amorphous (clear) rigid co-polyester & blends thereof plus about 0.05%-2% by wt. bluing dye agents. This layer is made using a cast tandem extrusion process. It provides an improved low-cost structural application of force for tooth/teeth movement, serves as a bonding layer to high-temperature layers, and affords enhanced ability to be thermoformed in the final application.

Third Layer: This layer is from about 1 mil to 8 mils thick, and is in contact with the tooth/teeth and comprises clear high-temperature polymers and blends thereof—polysulfone (PSU, PES, PPSU) plus from about 0.05%-2% by weight of bluing dye agents. This layer is made using a cast extrusion and surface treating process (corona, plasma, flame, and/or priming). It provides an improved low creep application with a higher force for tooth/teeth movement, and in combination with the first layer creates a rigid "I" beam-type construction to optimize efficiency.

FIG. 12 is a table.

FIG. 13 illustrates examples of polysulfones.

FIG. 14 shows a three-layer aligner.

FIG. 15 illustrates examples.

FIG. 16 illustrates a two-layer.

FIG. 17 illustrates a monolayer.

FIG. 18 illustrates hard hybrid layers.

FIG. 19 illustrates a three-layer.

FIG. 20 illustrates a two-layer.

FIGS. 21, 22 and 23 illustrate medicinal time release aligners.

FIG. 24 is a table.

Figure 25:
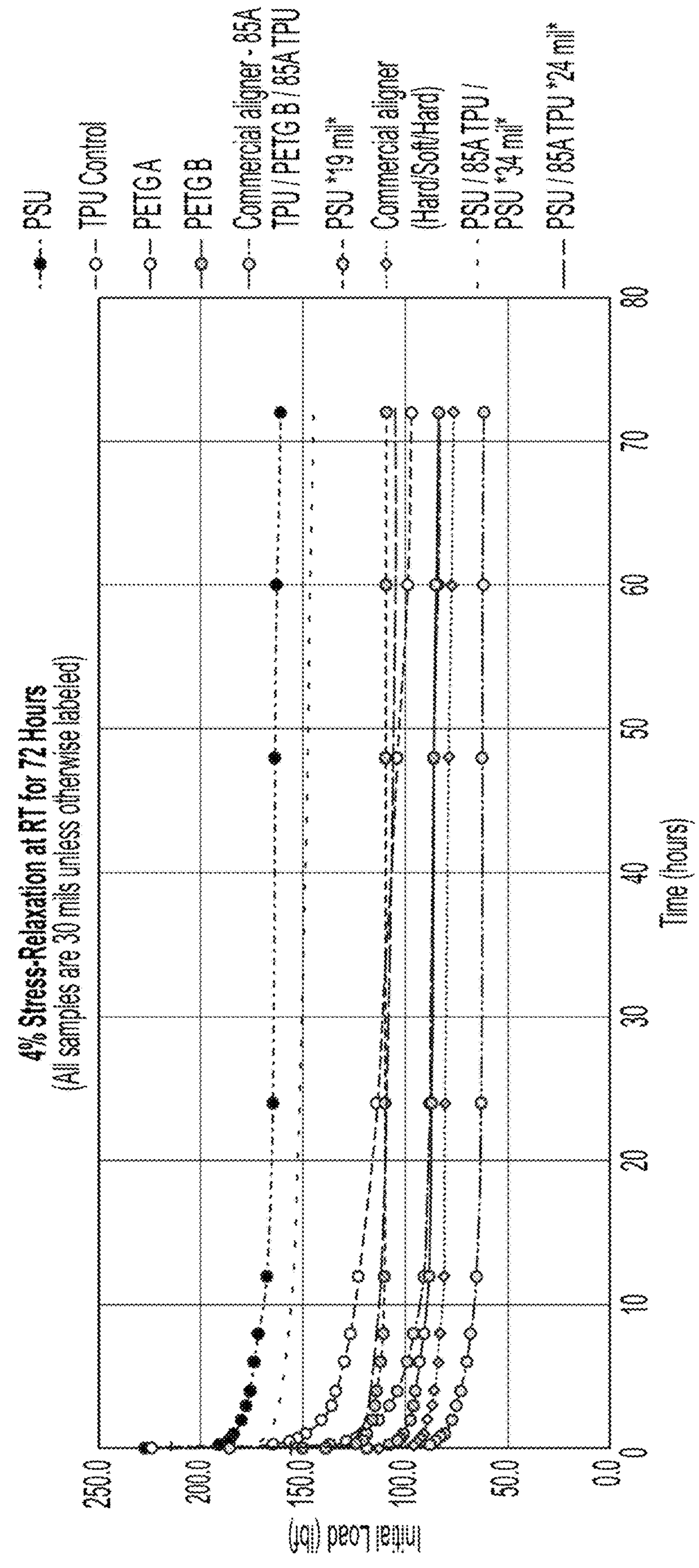

FIG. 25 is a graph.

FIG. 26 is a table.

Figures 27, 28:
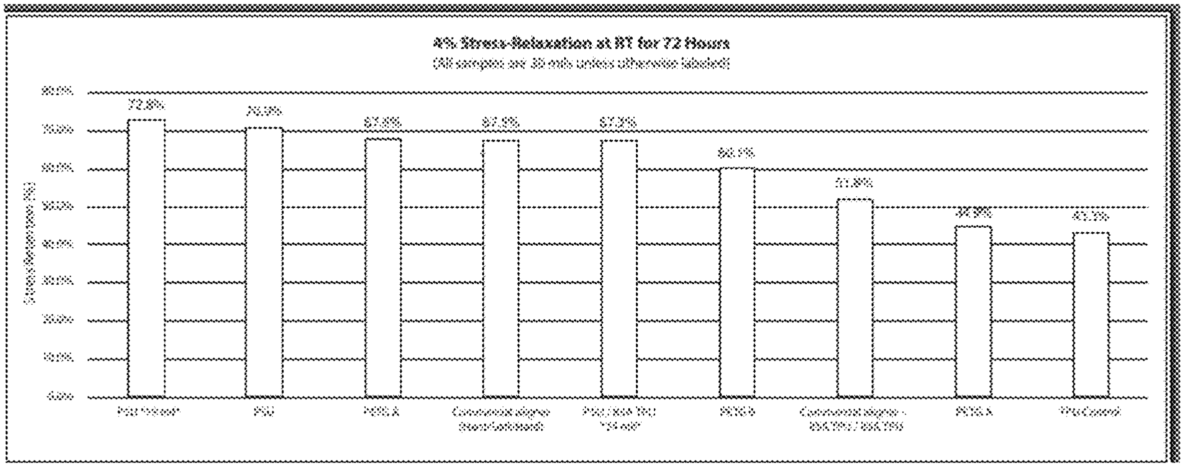

FIG. 27 is a chart.

FIG. 28 is a table.

Figure 29:
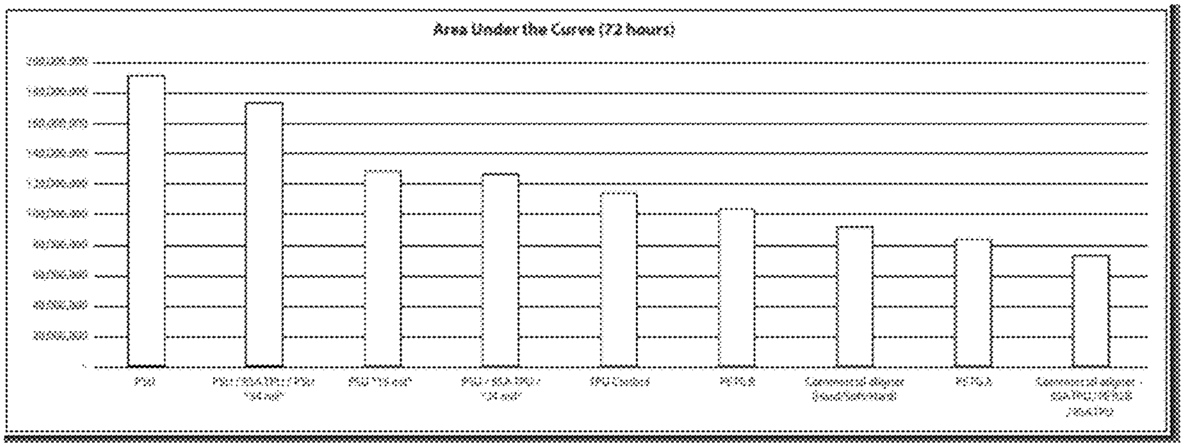

FIG. 29 is a graph.

DETAILED DESCRIPTION OF THE INVENTION

The instant invention in one embodiment provides a dental aligner comprising a component consisting of a plastic material having a Rockwell R hardness of greater than about 50 and less than about 130, and wherein the component is selected from polyethylene terephthalate glycol (PETG), rigid thermoplastic polyurethane (r-TPU), polysulfone, and combinations thereof.

Provided in a preferred embodiment is a dental aligner having a total thickness of from about 15 mils to about 30 mils. Yet another preferred embodiment provides a dental aligner wherein the dental aligner has a modulus ranging from about 200,000 psi but less than about 500,000 psi and applies an initial force ranging from about 120 lbs to about 300 lbs.

Another embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Provided in another embodiment is a dental aligner comprising an outer layer and an inner component, wherein the outer layer is soft and comprises a polymer having a Shore hardness from about 50 A to about 60 D, and is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof; and the inner component is harder than the outer layer and consists of a plastic material having a Rockwell R hardness greater than about 60 and less than about 115, and wherein the plastic material is selected from polyethylene terephthalate glycol (PETG), rigid thermoplastic polyurethane (r-TPU), polysulfone, and combinations thereof.

A preferred embodiment of this aspect of the present invention provides a dental aligner of wherein, the outer soft layer makes up from about 10% to about 20% of the total thickness of the dental aligner. Another preferred embodiment provides a dental aligner wherein the outer soft layer makes up from about 5% to about 15% of the total thickness of the dental aligner. Yet another preferred embodiment provides a dental aligner wherein, the dental aligner has a modulus of about 200,000 psi and less than about 500,000 psi and applies an initial force of about 120 lbs but less than about 300 lbs. Another embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Another aspect of the instant invention provides a dental aligner comprising multiple layers of material, selected from a core or inner layer, and skin or outer layers wherein, the core layer has a hard/strong component made using a plastic material having a Rockwell R hardness greater than about 60 and less than about 115, and is selected from polyethylene terephthalate glycol (PETG), rigid thermoplastic polyurethane (r-TPU), polysulfone, and combinations thereof; and the skin layers comprise a soft polymer having a Shore hardness from about 50 A to about 60 D, and is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

A preferred embodiment of this aspect provides a dental aligner wherein, the soft/skin layer makes up from about 10% to about 30% of the total thickness of the dental aligner. Another preferred embodiment provides a dental aligner wherein, the soft/skin layer makes up from about 5% to about 25% of the total thickness of the dental aligner. Yet another preferred embodiment provides a dental aligner of wherein, the core layer has a hard/strong component made using a plastic material having a Rockwell R hardness greater than about 90 and less than about 110, and the soft/skin layer has a Shore hardness greater than about 60 A and less than about 50 D.

A further preferred embodiment provides a dental aligner wherein, the dental aligner has a modulus of about 200,000 psi but less than about 500,000 psi, and applies an initial force of about 120 lbs but less than about 300 psi. Yet another further preferred embodiment provides a dental aligner wherein, the soft/skin layer has a hard/core layer sandwiched between two soft plastic layers, wherein the thickness of the hard/core layer is about 24 mil and the thickness of each of the soft/skin layers is about 3 mils.

Another embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Provided in another aspect of the instant invention is provided a dental aligner comprising a mono layer consisting of a thermoplastic material having a Rockwell R hardness of greater than about 50 and less than about 130, and wherein the thermoplastic material is selected from a family of homo and co-polymers of polysulfone and blends thereof.

A preferred embodiment of this aspect of the instant invention provides a dental aligner wherein the thermoplastic material having a total thickness of from about 15 mils to about 30 mils; and the thermoplastic homo and co-polymers of polysulfone has a modulus of elasticity from about 200,000 psi but less than about 500,000 psi. Yet another preferred aspect provides a dental aligner wherein the thermoplastic homo and co-polymers of polysulfone has an elongation at break from about 10% but less than 200%; and wherein the mono layer based on the homo and co-polymers of polysulfone is at least 15% better in stress relaxation than thermoplastic urethane and polyethylene terephthalate glycol in 4% stress-relaxation test at room temperature for 24 hrs. Another preferred aspect provides a dental aligner wherein the mono layer based on the homo and co-polymers of polysulfone further comprises at least 0.05 wt % but less than 2 wt % of a bluing dye material.

Another embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Yet another aspect of the instant invention provides a dental aligner comprising an outer layer and an inner layer, wherein the outer layer is hard and comprises a thermoplastic material having a Rockwell R hardness of greater than about 60 and less than about 110, and wherein the thermoplastic material is selected from a family of homo and co-polymers of polysulfone and blends thereof; and the inner layer against the tooth is softer than the outer layer and consists of a thermoplastic material having a Shore hardness from about 50 A to about 60 D, and a thermoplastic material is selected from thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

A preferred embodiment provides a dental aligner wherein, the inner soft layer makes up from about 10% to about 20% of the total thickness of the dental aligner; and wherein the inner soft layer makes up from about 5% to about 15% of the total thickness of the dental aligner. Yet another preferred embodiment provides a dental aligner wherein, the dental aligner has a modulus of about 200,000 psi and less than about 500,000 psi and applies an initial force of about 120 lbs but less than about 300 lbs. A preferred embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Another aspect of the instant invention provides a dental aligner comprising multiple layers of materials, selected from a core or inner layer, and skin or outer layers wherein the core layer has a rigid thermoplastic material having a Rockwell R hardness of greater than about 60 and less than about 110, and wherein the thermoplastic material is selected from a family of homo and co-polymers of polysulfone and blends thereof; and the skin layers comprise a soft thermoplastic polymer having a Shore hardness from about 50 A to about 60 D, and a thermoplastic material is selected from is thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof.

A preferred embodiment provides a dental aligner wherein, the outer soft/skin layer makes up from about 10% to about 30% of the total thickness of the dental aligner. Another preferred embodiment provides a dental aligner wherein, the soft/skin layer makes up from about 5% to about 25% of the total thickness of the dental aligner. Yet another preferred embodiment provides a dental aligner wherein, the core layer has a rigid thermoplastic material having a Rockwell R hardness of greater than about 90 and less than about 110, and the soft/skin layer has a Shore hardness greater than about 55 A and less than about 80 A. Yet another preferred embodiment provides a dental aligner wherein, the soft/skin layer has a hard/core layer sandwiched between two soft plastic layers, wherein the thickness of the hard/core layer is about 24 mil and the thickness of each of the soft/skin layers is about 3 mils.

A further preferred embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

Yet another aspect of the instant invention provides a dental aligner comprising multiple layers of materials, selected from a core or inner layer, and skin or outer layers wherein: the core layer has a soft thermoplastic polymer having a Shore hardness from about 50 A to about 60 D, and a thermoplastic material is selected from is thermoplastic polyurethane (TPU), thermoplastic elastomer (TPE), thermoplastic vulcanizates (TPV), elastomeric co-poly(ether or ester-ester), elastomeric co-poly (ether or ester-amide), co-polymers of ethylene-methyl (EMA) or ethylene-butyl acrylate (EBA) and combinations thereof; and the skin layers comprise a rigid thermoplastic material having a Rockwell R hardness of greater than about 60 and less than about 110, and wherein the thermoplastic material is selected from a family of homo and co-polymers of polysulfone and blends thereof.

A preferred embodiment provides a dental aligner wherein the dental aligner material comprises active ingredients and/or therapeutic compositions selected from pain relief medicines, anti-bacterial agents, teeth whitening agents, and agents that enhance dental treatment. Another preferred embodiment provides a dental aligner wherein the dental aligner material, over a period of time, releases active ingredients and/or therapeutic compositions selected from pain relief medicines, anti-bacterial agents, teeth whitening agents, and other agents that enhance dental treatment.

The instant invention, in one of its aspects, provides a dental aligner wherein the dental aligner is softer than the traditional dental aligner having a Shore D hardness of greater than 75 (>75). In one embodiment of this aspect is provided a dental aligner that is softer than a traditional aligner capable of tuning the force applied on the teeth as required by the treatment regimen and a patient's tolerance for pain. In another embodiment is provided a dental aligner wherein the creep is minimized to improve the malocclusion treatment (i.e., the force applied by the material on the teeth is more uniform, especially during the initial 24 hours of wearing the aligner). A preferred embodiment of this aspect of the invention provides a dental aligner that is thinner than a traditional dental aligner, and further offers a lower coefficient of friction for easier insertion and removal from the teeth while still effectively gripping the teeth to apply corrective force.

The present invention provides dental aligners that utilize particular polymers or combination of polymers and thicknesses to achieve a desired force profile and to minimize creep—for example, the polymers are polysulfones alone or a combination of polyesters. The polyester blended materials are softer and could be used alone as a 'single layer' aligner or combined with an outer elastomeric layer of TPU, PETG, or another co-polymer or terpolymer. The instant dental aligners include materials, in particular the softer materials, with the ability to incorporate slow-release capabilities. The slow release aspect enables the release/delivery of active ingredients and/or therapeutic compositions such as pain relief medicines, anti-bacterial agents, teeth whitening agents, or other agents that enhance dental treatment(s).

Another aspect of the present invention provides a single or mono layer dental aligner comprising a "comfort plastic" made by a single layer extrusion process or through additive manufacturing (3D printing). This single or mono layer dental aligner consists of materials selected from neat polymers or blends of relatively hard, strong TPU, PETG, PC, polysulfone, or all hard-segment, rigid TPU, and soft materials selected from neat polymers or blends of soft thermoplastic elastomeric urethanes, elastomeric polyesters, polyamides, styrenic block co-polymers, TPVs, EMAs, EBAs, and other TPEs, or TPOs. The soft component content of the dental aligner ranges from about 3% to about 50% of the total material of the dental aligner.

Another embodiment of this aspect provides a dental aligner consisting of material with a Shore Hardness of about 50 D to about R100 and modulus of about >200,000 psi to about less than 500,000 psi and an initial force of about >120 lbs and less than about 300 lbs at a total thickness of the aligner of about 30 mil. A further preferred embodiment provides a dental aligner consisting of material with a Shore Hardness of about 70 D to about R100 and a force of about 200 lbs to about 275 lbs.

The hard component will be the "working" part of the formula that moves the teeth while the soft component provides the softer, more compliant comfort aspect and more effective force transmission of the plastic to the teeth.

Another aspect of the present invention provides a dental aligner comprising two layers of comfort plastic. One embodiment of this aspect provides a dental aligner comprising an inner or base layer made of a strong, hard plastic such as PETG, PC, polysulfone, TPU and the like that provides the "working" part of the plastic sheet that moves the teeth. The skin or the outer layer comprises a soft polymer such as TPU, TPE, elastomeric co-polyester, EMA, EBA and the like that provides a layer of comfort from the hard, base layer and ability to conform to the tooth surface contour effectively gripping and transferring tooth movement forces.

Another embodiment of this aspect provides a dental aligner wherein the soft skin layer comprises about 3% to about 20% of the total thickness of the dental aligner. Yet another embodiment provides a dental aligner with a Shore hardness of the soft skin layer ranging from about 40 A to about 50 D. A further preferred embodiment provides a dental aligner consisting of material with a Shore Hardness of about 70 D to about R100 and a force of about 200 lbs to about 275 lbs.

Yet another aspect of the present invention provides a dental aligner with more than two layers of comfort plastic. One embodiment of this aspect provides a dental aligner comprising a core or inner layer consisting of a strong, hard plastic such as PETG, PC, polysulfone, TPU and others that provides the "working" part of the plastic sheet that moves the teeth. The outer or skin of this embodiment comprise a soft polymer such as TPU, TPE, elastomeric co-polyester, EMA, EBA and others that provides layers of comfort and force transmission from the hard, base layer. Another embodiment of this aspect provides a dental aligner wherein the outer soft skin layers comprise about 3% to about 30% of the total thickness of the dental aligner. Yet another embodiment provides a dental aligner with a Shore hardness of the soft skin layer ranging from about 40 A to about 50 D. A further preferred embodiment provides a dental aligner consisting of material with a Shore Hardness of about 70 D to about R100 and a force of about 200 lbs to about 275 lbs.

Yet another embodiment of this aspect provides multiple "soft" layers that balance comfort, conformance to tooth contours, grip and comfort for tuning and optimizing the dental and/orthodontic therapy.

Yet another embodiment of this aspect of the invention provides a dental aligner with a multilayer construction using a "working" plastic as the hard skin layers and a core layer of soft plastic (potential chemistries described above.) The core layer comprises from about 5% to about 60% of the total thickness.

Definitions

As used herein, the term "Dental Aligner" represents orthodontic devices that are generally transparent, made of plastic and are used to adjust teeth. Clear or transparent aligners are an alternative to traditional braces and are designed to help guide teeth into their proper position. Similar to braces, clear aligners use a gradual force to control tooth movement, but without metal wires or brackets. The dental aligners have been traditionally made of a strong plastic material and are fabricated to fit each individual's mouth. If a series of aligners are needed, each aligner moves the teeth in increments until the desired movement is achieved. The dental aligners of the instant invention are made of a combination of soft and hard plastic material, as discussed in the present specification.

The term "plastic material" as used herein represents materials used to make dental aligners. One example of plastic material is an elastic thermoplastic which when used to make dental aligners helps apply pressure to the tooth/teeth to move the tooth in a desired position.

The term "shore hardness" as used herein is a measure of the resistance a material has to indentation. There are different Shore Hardness scales for measuring the hardness of different materials. These scales were invented so that people can discuss these materials and have a common point of reference. The Shore 00 Hardness Scale measures rubbers and gels that are very soft. The Shore A Hardness Scale measures the hardness of flexible mold rubbers that range in hardness from very soft and flexible, to medium and somewhat flexible, to hard with almost no flexibility at all. Semi-rigid plastics can also be measured on the high end of the Shore A Scale. The Shore D Hardness Scale measures the hardness of hard rubbers, semi-rigid plastics and hard plastics.

The term "total thickness" is intended to represent the thickness of a dental aligner including the soft and rigid layers taken together.

The term "modulus" as used herein represents the elastic modulus of a material or device defined as the slope of its stress—strain curve expressed in pounds per square inch (psi).

The term "outer/skin layer" represents the outer part of a dental aligner which is generally softer than the layer it encompasses and is the portion that is in direct contact with the teeth/tooth, and also the tongue and inner part of one's cheek.

Figure 1:
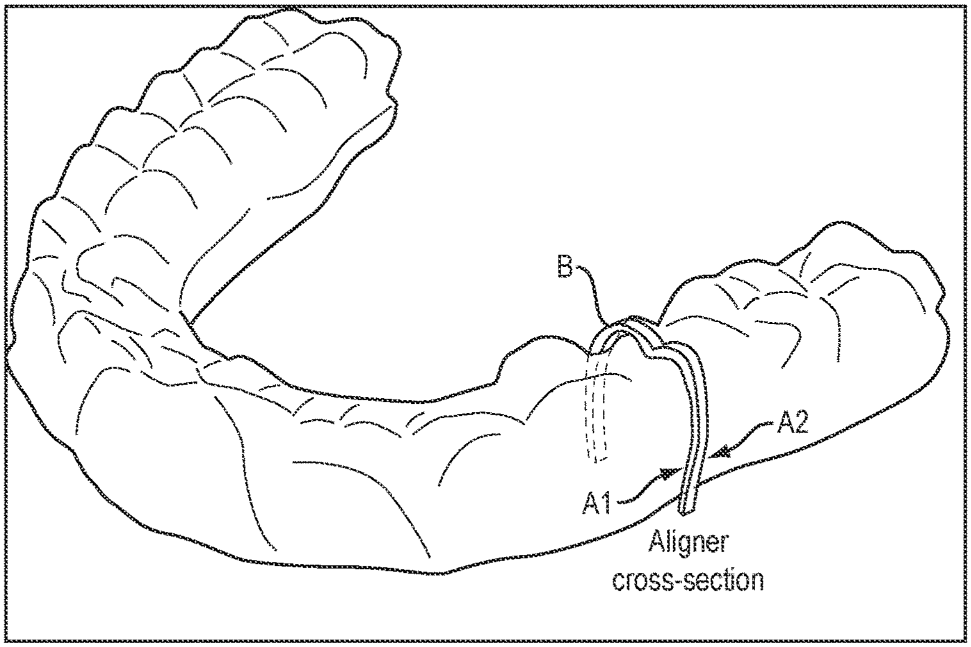
FIG. 1: Depicted in FIG. 1 is a dental aligner. The inner surface of the dental aligner is the surface marked as A1 and is in contact with the tooth/teeth when the dental aligner is placed in position on the tooth/teeth. This inner surface generally comprises softer material than the material that is contained within. The outer surface of the dental aligner, marked as A2, is generally exposed to the inner side of the cheek, and is not in contact with the tooth/teeth on which the dental aligner is placed. This outer surface (A2) generally also comprises softer material like the inner surface (A1) and can be made of the same or different softer material. The inner surface and the outer surface taken together cover the generally harder retainer layer B, the core layer, such that the harder layer B is contained within the inner and the outer layer in its entirety. Regardless of whether the layers A1 and A2 are made of the same material or different material and softness the two layers are seamlessly connected to the core layer B and form the outer skin of the laminate construction.
Figure 2:
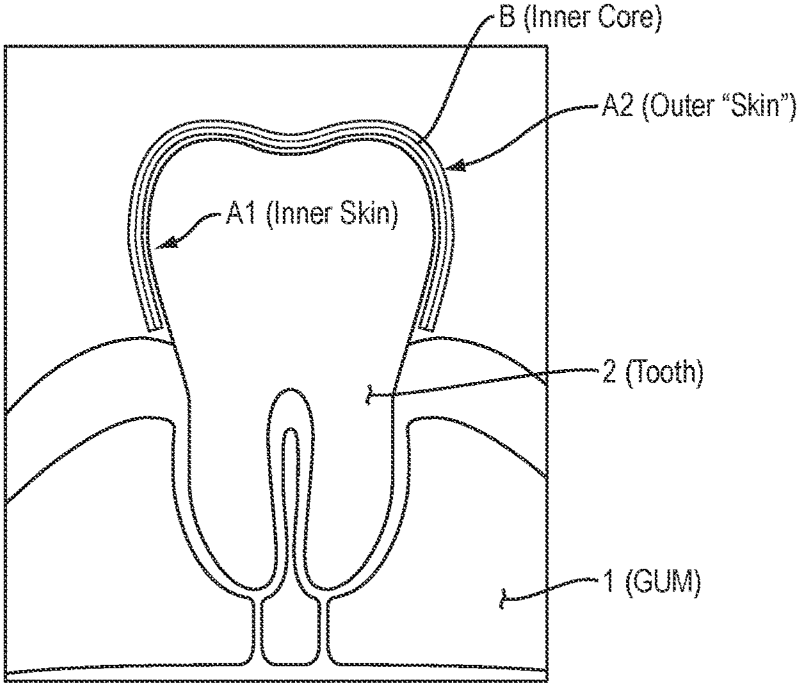
FIG. 2: Depicted in FIG. 2 is a cross section of a tooth, surrounding gum and the dental aligner. The gum area (1) surrounds a tooth (2). On top of the tooth is a dental aligner (3). The inner surface (A1) of the dental aligner is in in contact with the tooth (2). The inner surface generally comprises softer material. The outer layer/surface (A2) is on the opposite side of the inner layer/surface (A1). The outer surface (A2) is generally exposed to the inner side of the cheek and is not in contact with the tooth/teeth on which the dental aligner is placed. This outer surface (A2) generally also comprises softer material like the inner surface (A1) and can be made of the same or different softer material. The inner surface and the outer surface taken together cover the generally harder retainer layer B such that the harder layer B is sandwiched between the inner and the outer layer. Regardless of whether the layers A1 and A2 are made of the same material or different material and softness the two layers are connected seamlessly to the core layer B and form the outer skin of the laminate construction.
Figure 3:
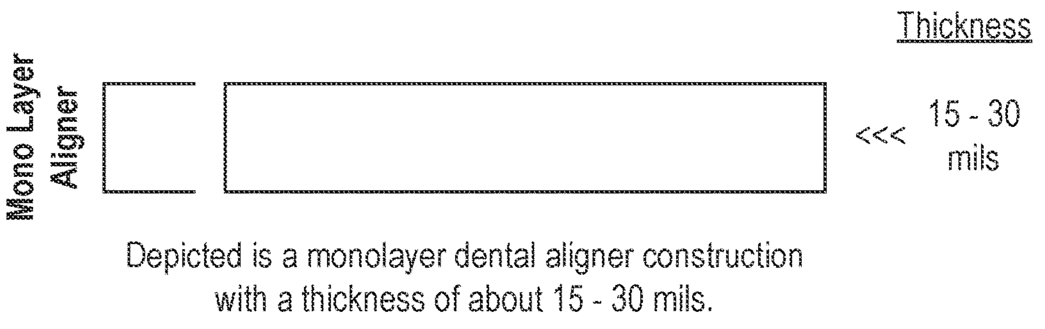
FIG. 3.
Figure 4:
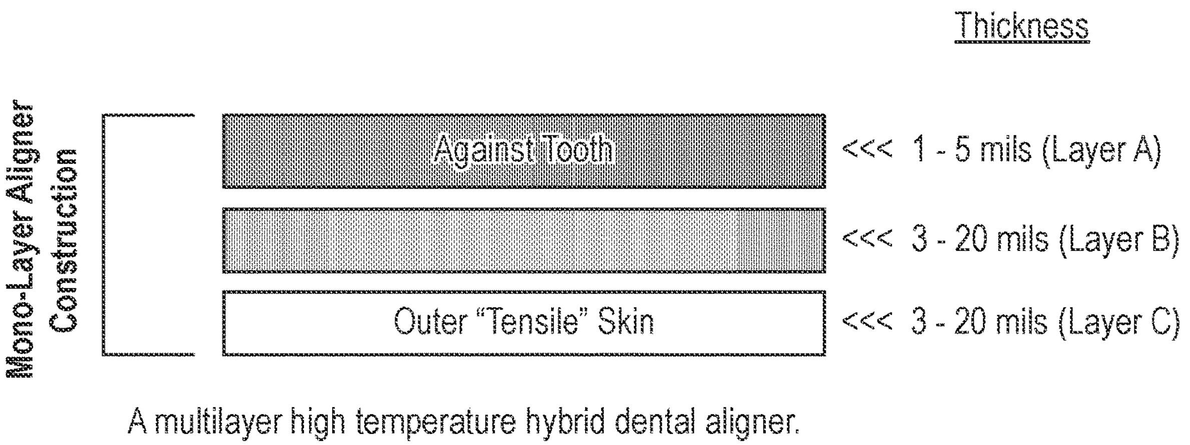
FIG. 4: This figure depicts a multilayer high temperature hybrid dental aligner. The first layer comprises from about 3 to 20 mils of a hard outer layer (aka outer "tensile" skin) and is selected from homo and co-polymers of polysulfone such as PSU, PES, PPSU, and their blends having a Rockwell R hardness of greater than about 70 and less than about 110 or Shore D hardness of at least R100. This layer is in contact with the tongue and cheeks when the aligner is placed inside the mouth. A second internal core layer comprises amorphous (clear) rigid co-polyester & blends thereof +0.05%-2% by wt. bluing dye agents, having a Rockwell R scale hardness of greater than about 60 and less than about 110. The third layer comprises an elastomer of about Shore 80 A hardness—aromatic polyether based TPU; COPE; SBC, olefin functional elastomer having a thickness of from about 1 mil to about 10 mils and is in contact with the teeth.

The term "inner component" as used herein represents a generally harder/rigid material of a dental aligner. The inner component is generally completely encompassed within the outer generally softer layer. Illustrative example is as shown in FIG. 1 portion B.

The term "hard/strong component" as used herein represents the inner component described above. Illustrative examples of a hard/strong component are plastic materials having a shore hardness component greater than about 55 D and less than about R100, and is selected from polyethylene terephthalate glycol (PETG), polysulfone, thermoplastic polyurethane (TPU), and combinations thereof.

The term "TPE" represents a thermoplastic elastomer. The term "TPU" represents a thermoplastic polyurethane. The term "EMA" as used herein represents Ethylene Methyl Acrylate Co-polymer. The term "EBA" as used herein represents Ethylene Butyl Acrylate Co-polymer. The term "TPV" represents a thermoplastic vulcanizate.

The term "initial force" as used herein represents the initial force in pounds (lbs) exerted on the teeth when a dental aligner is placed on top of the teeth. This initial force is proportional to the kind of materials used to construct a dental aligner.

The term "Pain Relief Medicines", as used herein, represents medicines that are administered to an individual to reduce bodily pain including headaches, sore muscles, arthritis, or other aches and pains. There are many different pain medicines, and each one has advantages and risks. Some types of pain respond better to certain medicines than others. Each person may also have a slightly different response to a pain reliever. Illustrative examples of pain relief medicines are over the counter (OTC) medicines such as acetaminophen (Tylenol). Another example of a pain relief medicine is nonsteroidal anti-inflammatory drugs (NSAIDs). Examples of NSAIDs are Aspirin, naproxen (Aleve), and ibuprofen (Advil, Motrin).

The term "Anti-bacterial Agents" as used herein represents a group of materials that fight against pathogenic bacteria. Thus, by killing or reducing the metabolic activity of bacteria, their pathogenic effect in the biological environments can be minimized. Furthermore, these materials can prevent bacterial plaque accumulation in the oral environment and therefore, can reduce the prevalence of plaque-related diseases such as caries. However, it should be noted that antibacterial agents do not necessarily possess anti-plaque accumulation properties. Illustrative examples of anti-bacterial agents are amoxicillin, doxycycline, cephalexin, ciprofloxacin, clindamycin, metronidazole, and azithromycin.

The term "Teeth Whitening Agents" as used herein are used to make teeth look whiter. The materials remove stains or other discoloration from the tooth surface. Hydrogen peroxide is the active ingredient most commonly used in tooth whitening products and is delivered as either hydrogen peroxide or carbamide peroxide. Baking soda is reported to be a low abrasive, and effective stain removal and tooth whitening agent.

The term "thermoplastic material" as used herein represents a plastic polymer material that becomes moldable at a certain elevated temperature and solidifies upon cooling. Most thermoplastics have a high molecular weight. The polymer chains associate by intermolecular forces, which weaken rapidly with increased temperature, yielding a viscous liquid. In this state, thermoplastics may be reshaped and are typically used to produce parts by various polymer processing techniques such as injection molding, compression molding, calendaring, and extrusion. Thermoplastics differ from thermosetting polymers (or "thermosets"), which form irreversible chemical bonds during the curing process. Thermosets do not melt when heated, but typically decompose and do not reform upon cooling.

The term "Rockwell R hardness" as used herein represents the hardness of the material by measuring the depth of penetration of an indenter under a large load compared to the indentation made by a pre-load. There are different scales, denoted by a single letter, that use different loads or indenters. The result is a dimensionless number. Indenters can be diamond tips, steel or Tungsten Carbide balls. The Rockwell testing procedures used in the Plastic Industry are ASTM D785 and ISO2039-2 and are outlined in haps://omnex-us.specialchem.com/polymer-properties/properties/hardness-rockwell-m?src=omproperty&utm_source=selection-resources&utm_medium=polymer-properties&utm_campaign=hardness.

The term "homopolymers of polysulfone" (PSU) is intended to represent a family of high-performance thermoplastics containing an aryl-$SO_2$-aryl subunit. These polymers are known for their toughness and stability at high temperatures. Three polysulfones are used industrially, these are polysulfone (PSU), polyether sulfone (PES) and polyphenylene sulfone (PPSU). They can be used in the temperature range from −100 to +200° C. and are used for electrical equipment, in vehicle construction and medical technology.[1] They are composed of para-linked aromatics, sulfonyl groups and ether groups and partly also alkyl groups. Polysulfones have outstanding resistance to heat and oxidation, hydrolysis resistance to aqueous and alkaline media and good electrical properties as outlined in https://en.wikipedia.org/wiki/Polysulfone. Examples are shown in the table illustrated in FIG. 12.

Polysulfones used herein include those that are rigid and have a Rockwell R hardness of from about 60 to about 130. Illustrative examples and sources for the same are shown in FIG. 13.

The term "co-polymers of polysulfone" is intended to represent di-hydroxy terminated polysulfone with other oligomers (low molecular weight polymers) or polymers such as polyethylene glycol or polydimethylsiloxane materials as outlined in https://www.sciencedirect.com/science/article/abs/pii/S0142961205006058 and https://onlinelibrary.wiley.com/doi/abs/10.1002/pol.1971.150091105, just to mention a few.

The term "mils" is used herein as a measurement of thickness and it equals one-thousandth of an inch, or 0.001 inch. One mil equals 0.0254 mm (millimeter).

The abbreviation "MPa" represents the megapascal is a x1000000 multiple of the pascal unit which is the SI unit for pressure or force. 1 megapascal equals 1,000,000 pascals or 145.04 psi as outlined in https://en.wikipedia.org/wiki/Pascal_(unit).

The term "elongation at break" is intended to represent the material property which is determined from the ratio between changed length and initial length after breakage of the test specimen in tensile testing. It expresses the capability of a material to resist changes of shape without crack formation as outlined in https://www.wikidata.org/wiki/Property:P5811.

EXAMPLES

Dental aligners of the present invention comprise soft components/layers/skins and hard/rigid layers/components as described above. The following examples illustrate the different dental aligners of the present invention.

Example 1—Multi-Layer Aligner

The following example illustrates a dental aligner with three layers, a soft component with a thickness of about 3 mil and hard component with a thickness of about 24 mil. The two 3 mil soft layers are on the outside and are in contact with the tooth/teeth and with the inner part of the cheek and tongue. The two soft layers can be distinct from one another in that they are on the opposite side of the aligner (one in direct contact with the tooth/teeth and the other with direct contact with the inner part of the cheek and tongue). These soft layers can have different thickness and taken together they entirely encapsulate the hard/rigid layer.

For all of the following examples, "R100"=Rockwell Hardness R100

A Three Layer Aligner is shown in FIG. 14. The soft layers can range in thickness from about 3 mil to about 10 mil each.

Example 2—Multi-Layer Aligner

This example varies from Example 1 in that here the hard/rigid layer encapsulates the soft layer and the two rigid layers can be distinct from one another in that they are on the opposite side of the aligner (one in direct contact with the tooth/teeth and the other with direct contact with the inner part of the cheek and tongue). Specifics of the hard/rigid and soft layer/components are as follows. The thickness of each layer in this example is about 10 mil, as shown in FIG. 15.

Example 3—Two-Layer Aligner

The following example illustrates a dental aligner with two layers, a soft component with a thickness of about 4 mil and hard component with a thickness of about 26 mil, where the soft layer is in contact with the teeth. See FIG. 16 for two-layer.

Example 4—Single/Mono Layer Aligner

The following example illustrates a dental aligner with a single or mono layer with a hard/rigid component with a thickness ranging from about 15 mil to about 30 mil. See FIG. 17 for monolayer.

Example 5—Multi-Layer High Temperature Hybrid Dental Aligner

The following example illustrates a multi-layer dental aligner made with three layers. The first layer is about 5 to 20 mils thick and comes in contact with the tooth when placed in the mouth. It is made with an amorphous, clear, rigid co-polyester and blends thereof with bluing dye agents in amount ranging from about 0.05% to about 2% by total weight. The second layer (core layer) is about 1 to about 10 mils thick and comprises at least 80 Shore A aromatic polyether based thermoplastic urethane (TPU), COPE (co-polyether-ester), olefin functional elastomer, styrene butadiene block co-polymer. The third layer (aka outer "tensile" skin) is about 3 to about 15 mils thick and comprises clear high temperature polymers and blends thereof—selected from Polysulfone (PSU, PES, and PPSU) along with bluing dye agents in amount ranging from about 0.05% to about 2% by total weight. See FIG. 18 for hard hybrid layer(s).

Example 6—Three-Layer High Temperature Dental Aligner

As shown below in FIG. 19, the outer skin layers (i.e. one of the outer skin layer against tooth, the other skin layer in contact with cheek and tongue) are selected from soft materials having a Shore A of about 80 and selected from aromatic polyether based TPU or co-polyether ester or olefin functional elastomer and the inner layer (aka core) is selected from Polysulfone (PSU, PES, and PPSU) along with bluing dye agents in amount ranging from about 0.05% to about 2% by total weight.

Example 7—Two-Layer High Temperature Dental Aligner

As shown below, the multi-layer Dental aligner wherein the outer layer (aka "outer tensile" skin) is selected from a hard material based on homo and co-polymers of polysulfone and their blends along with bluing dye agents and the inner layer against the tooth is selected from soft materials having a Shore A of about 80 selected from aromatic polyether based TPU or co-polyether ester or olefin functional elastomer. See FIG. 20 for two layer.

The dental aligners of the present invention provide enhanced sustained force at lower thicknesses, as well as reduced polymer creep (or stress relaxation), on the tooth and thereby help lower the overall time required to move the teeth with less pain and may help reduce the need for mid-course corrections. In some cases, it may also reduce the overall number or retainers required for a particular treatment.

Illustrative examples of dental aligners comprising therapeutic agents are provided in FIGS. 21, 22 and 23.

It is understood that one or more therapeutic agent(s) can be incorporated in any one or more of the multiple layers of the dental aligner.

TABLES AND GRAPHS

Background: 4% Stress-Relaxation test (RT for 72 hours) was performed on the following samples per Bixby's internal procedures. All samples were 30 mils thick unless noted otherwise.

Results: Force/load (lbf) values are reported at time intervals specified in the table I in FIG. 24. Table I lists the stress relaxation for dental aligners with mono layers PSU, TPU (control), PETG A, PETG B each 30 mil thick. Also included is a three layer aligner with soft skin layers 85 A hardness and center core rigid layer PETG B; a mono layer aligner made of 30 mil PSU and 19 mil thick; a three layer aligner with rigid PSU skins and a soft 85 A TPU core at 34 mils; a two layer aligner with a PSU base and a 85 A TPU skin; and a commercially available aligner with hard skins and a soft core. The column with “0” is time zero showing the starting force at time zero and the loss in the force over a period of time at intervals of quarter hour, half hour, three fourth hour, 1, 2, 3, . . . 72 hours.

Graph I in FIG. 25 depicts the stress loss profile over time for each of the aligners in Table I. The initial stress is along the Y axis and the loss of the stress is represented going from left to right along the X axis.

Table II in FIG. 26 lists the stress relaxation for dental aligners with mono layers PSU, TPU (control), PETG A, PETG B each 30 mil thick. Also included is a three layer aligner with soft skin layers 85 A hardness and center core rigid layer PETG B; a mono layer aligner made of PSU and 19 mil thick; a three layer aligner with rigid PSU skins and a soft 85 A TPU core at 34 mils; a two layer aligner with a PSU base and a 85 A TPU skin; and a commercially available aligner with hard skins and a soft core. The column with “0” is time zero showing the starting force at time zero and the loss in the force over a period of time at intervals of quarter hour, half hour, three fourth hour, 1, 2, 3, . . . 72 hours.

Graph/Chart II in FIG. 27 represents the retained stress for aligners listed in Table II. The aligner with the least stress loss is on the left.

Area under the curve was calculated after performing the 4% S–R test. Seventy-two hour values are reported in Table III shown in FIG. 28.

Table III lists the area under the curve calculated after performing the 4% stress relaxation test (72 hours) for dental aligners with mono layers PSU, TPU (control), PETG A, PETG B each 30 mil thick. Also included is a three-layer aligner with soft skin layers 85 A hardness and center core rigid layer PETG B; a mono layer aligner made of PSU and 19 mil thick; a three layer aligner with rigid PSU skins and a soft 85 A TPU core at 34 mils; a two layer aligner with a PSU base and a 85 A TPU skin; and a commercially available aligner with hard skins and a soft core. Larger values of area under the curve represents the greater work performed by the material & construction, or the cumulative amount of force over time applied to move teeth over 72 hours.

Graph/Chart III in FIG. 29 represents the area under the curve for aligners listed in Table III.

The invention claimed is:

1. A dental aligner comprising a softer first layer operative to contact a subject’s teeth after the dental aligner is placed on the subject’s teeth and a harder second layer on the first layer, the second layer not in contact with the subject’s teeth; wherein the dental aligner is one of a number of dental aligners planned for an orthodontic treatment of the subject to incrementally move the subject’s teeth over a period of time to a corrected teeth position utilizing the number of aligners, the dental aligner including:

the first layer, wherein the first layer has a lower Shore hardness at the tooth contacting interface than the second layer; and the first layer consists of a first amorphous thermoplastic material having a Shore hardness from about 50A to about 60D; and wherein the first amorphous thermoplastic material consists of thermoplastic polyurethane (TPU), thermoplastic elastomer (TPE), thermoplastic vulcanizates (TPV), elastomeric co-poly (ether or ester-ester), elastomeric co-poly (ether or ester-amide), co-polymers of ethylene-methyl (EMA) or ethylene-butyl acrylate (EBA), or a combination thereof; wherein the first amorphous material is in contact with the subject’s teeth and is transparent when viewed upon the subject’s teeth;

the second layer, wherein the second layer is hard and consists of a second thermoplastic material having a Rockwell R hardness of greater than about 60 and less than about 110, and wherein the second thermoplastic material consists of polysulfone (PSU) PSU-having the repeating unit shown below:

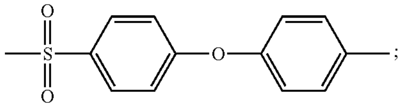
;

PSU wherein the first thermoplastic material is amorphous and is formed by a cast tandem extrusion process including a surface treatment selected from, corona discharge, plasma treatment, flame treatment, or priming; wherein, when tested as a 30 mil (762 μm) test specimen under a 4% stress-relaxation protocol at room temperature, the aligner construction retains at least 69.5% of its initial load at 24 hours; and wherein the first layer constitutes 5-25% of the total wall thickness.

2. The dental aligner of claim 1, wherein the dental aligner has an initial modulus in the range from 200,000 psi to 500,000 psi and when subjected to a 4% stress-relaxation test at room temperature using a 30 mil (762 μm) thick test specimen, has an initial load at time zero in the range from 120 lbf to 300 lbf.

3. The dental aligner of claim 1, wherein the total thickness of the dental aligner is not more than 20 mils (≤0.508 mm).

4. The dental aligner of claim 1, wherein, under a 4% strain at room temperature using a stress-relaxation test with a 30 mil (762 μm) thick test specimen, the dental aligner retains at least 69.5% of its initial load after 24 hours and a stress relaxation of not more than 30.5%.

5. The dental aligner of claim 1, wherein the dental aligner is configured to apply work to the subject’s teeth as measured by the total area under an aligner construction’s stress relaxation curve over 72 hours at a total wall thickness of about 24 mil of greater than 35,000,000 pound-force-hour and is operative to maintain greater than 65% of the initial load when measured on a 30 mil (762 um) test specimen of the same layer construction when under a 4% strain over 72 hours measured by a 4% stress relaxation test at room temperature with the 30 mil sample.

6. The dental aligner of claim 5, wherein the total area under the curve over 72 hours is ≥35,000,000 pound-force hour.

7. The dental aligner of claim 1, wherein the second layer Rockwell R hardness is at least 100 and less than about 110.

* * * * *